(12) United States Patent
Chopra et al.

(10) Patent No.: US 9,740,700 B1
(45) Date of Patent: Aug. 22, 2017

(54) SNAPSHOT MAP

(71) Applicant: EMC IP Holding Company LLC, Hopkinton, MA (US)

(72) Inventors: Shelesh Chopra, Bangalore (IN); Eric Christian Matthies, Millis, MA (US); Christopher Francis Wroten, Franklin, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 536 days.

(21) Appl. No.: 14/083,201

(22) Filed: Nov. 18, 2013

(51) Int. Cl.
*G06F 13/00* (2006.01)
*G06F 17/30* (2006.01)

(52) U.S. Cl.
CPC .............................. *G06F 17/30088* (2013.01)

(58) Field of Classification Search
CPC . G06F 7/00; G06F 12/00; G06F 13/00; G06F 13/28
See application file for complete search history.

(56) References Cited

U.S. PATENT DOCUMENTS

| | | | |
|---|---|---|---|
| 7,484,059 B1* | 1/2009 | Ofer | G06F 3/0607 711/162 |
| 7,788,244 B2 | 8/2010 | Xu et al. | |
| 8,024,292 B2* | 9/2011 | Thompson | G06F 11/1466 707/640 |
| 8,291,261 B2 | 10/2012 | Malleck et al. | |
| 8,559,683 B2 | 10/2013 | Wada | |
| 8,959,054 B1 | 2/2015 | Natanzon | |
| 9,218,138 B1 | 12/2015 | Haase et al. | |
| 9,256,372 B2 | 2/2016 | Sato et al. | |
| 2007/0006018 A1* | 1/2007 | Thompson | G06F 11/1466 714/6.12 |
| 2014/0101113 A1* | 4/2014 | Zhang | G06F 11/1453 707/692 |

* cited by examiner

*Primary Examiner* — Charles Rones
*Assistant Examiner* — Han Doan
(74) *Attorney, Agent, or Firm* — Staniford Tomita LLP

(57) ABSTRACT

This disclosure relates to a method, article of manufacture, and apparatus for generating a snapshot map used to facilitate storage system management. In some embodiments, this includes receiving a set of selection criteria, generating a snapshot map based on the set of selection criteria, associating the snapshot map with a timestamp, storing the snapshot map along with the timestamp, associating an identifier after storing the snapshot map and the timestamp in a database, and displaying the snapshot map after obtaining the snapshot map from the database based on the identifier.

20 Claims, 14 Drawing Sheets

SNAPSHOT MAP

CROSS-REFERENCE TO RELATED APPLICATIONS

This non-provisional application is also related to co-pending U.S. patent application Ser. No. 14/083,283, filed Nov. 18, 2013, titled "BACKUP CONFIGURATION USING SNAPSHOT MAP" and U.S. patent application Ser. No. 14/083,254, filed Nov. 18, 2013, titled "SNAPSHOT HISTORY MAP" filed concurrently herewith, which are incorporated herein by reference for all purposes.

FIELD

The present system and method relates generally to computer systems and specifically to systems and methods of snapshot management on computer systems.

BACKGROUND

Snapshot backups have been in play for some time and are gaining traction at a swift pace. In a snapshot system, applications running on hosts may store data on source storage. For data protection, snapshots of the source storage may be taken and stored on target storage. Different target storage may be configured for different snapshot methods. For example, when SNAP method is used to perform a snapshot backup, a target storage configured for SNAP method may be paired with the source storage to store snapshot data using SNAP method. When clone or mirror is used to perform a snapshot backup, a different target storage configured for clone or mirror may be paired with the same source storage.

Systems and methods may be in place to pool target storages configured for multiple snapshot methods. In such systems, when performing a snapshot, intelligence may be built in to automatically choose an optimal snapshot method based on data change rate fluctuation. Depending on the chosen snapshot method, some target storage from the pool configured for the snapshot method may be paired with the source storage. In such systems, generating a snapshot map may provide many uses in storage system management.

BRIEF DESCRIPTION OF THE DRAWINGS

Some embodiments of the system and method are described, by way of example, with respect to the following figures.

DETAILED DESCRIPTION

Figure 1:
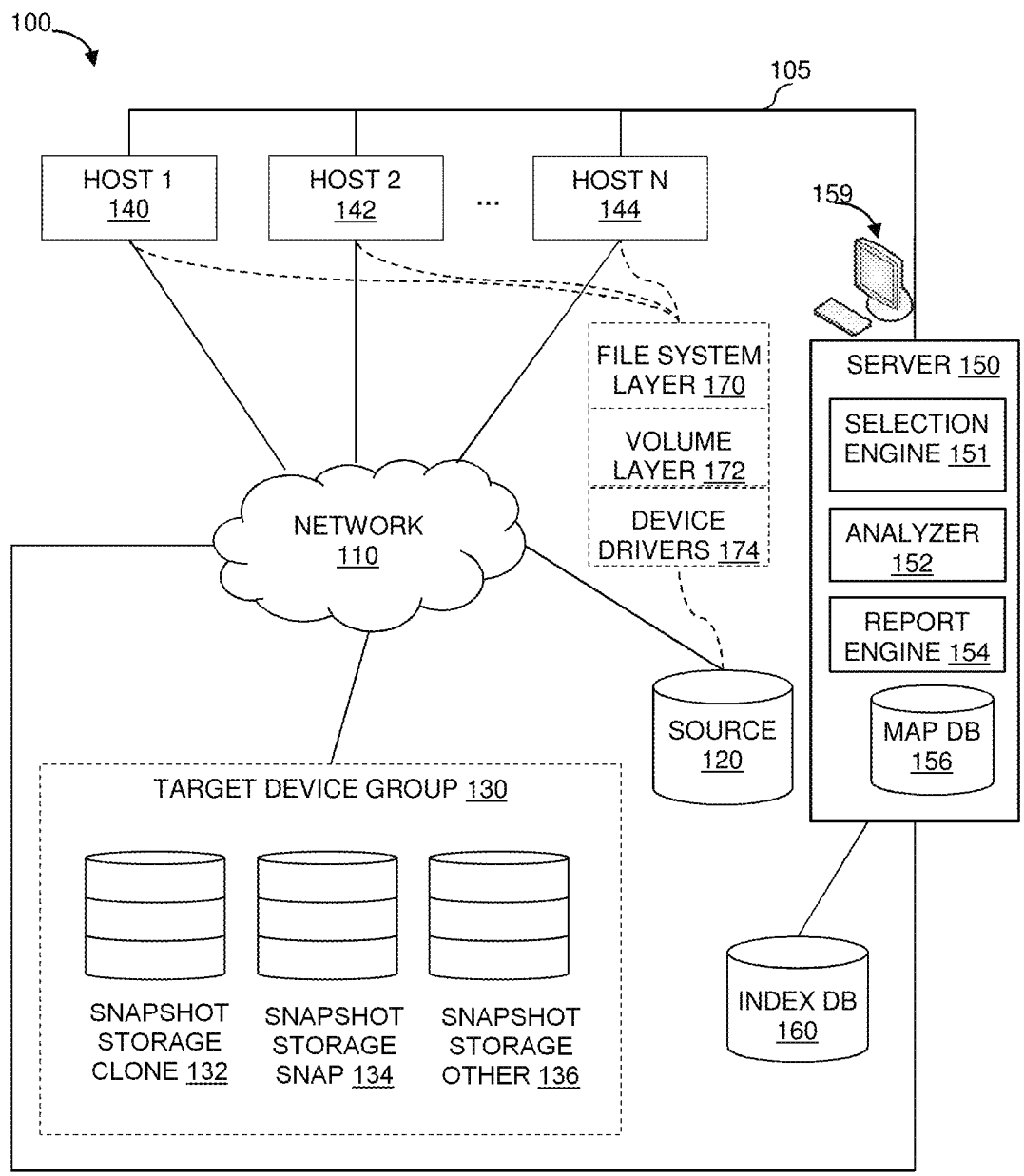
FIG. 1 is a diagram of an example system used to generate snapshot maps for storage system management.

A detailed description of one or more example embodiments of a system and method is provided below along with accompanying figures. While this system and method is described in conjunction with such embodiment(s), it should be understood that the system and method is not limited to any one embodiment. On the contrary, the scope of the system and method is limited only by the claims and the system and method encompasses numerous alternatives, modifications, and equivalents. For the purpose of example, numerous specific details are set forth in the following description in order to provide a thorough understanding of the present system and method. These details are provided for the purpose of example, and the system and method may be practiced according to the claims without some or all of these specific details. For the purpose of clarity, technical material that is known in the technical fields related to the system and method has not been described in detail so that the present system and method is not unnecessarily obscured.

It should be appreciated that the present system and method may be implemented in numerous ways, including as a process, an apparatus, a device, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the system and method. Applications may also be downloaded, in whole or in part, through the use of a software development kit or toolkit that enables the creation and implementation of the present system and method. In this specification, these implementations, or any other form that the system and method may take, may be referred to as techniques. In general, the order of the steps of disclosed processes may be altered within the scope of the system and method.

Illustrated is a system and method for generating a snapshot map and utilizing the snapshot map to facilitate storage system management. In storage systems, backups, such as snapshots, may be used for data protection. A snapshot, as used herein, may include a backup copy of data as it appeared at a point in time. The backup copy of data may be of a body of data to be backed up such as a full volume, or may only be an incremental change in that body of data from an earlier snapshot, bookmark, or state. For example, a snapshot corresponds to a single write, a plurality or writes, and is one of the following types: full volume, incremental, read-only, read/write, clone, consistency group, copy-on-write, low-capacity, or split-mirror, among others. Each snapshot may be labeled with a unique snapshot identifier. In one example embodiment, the snapshot identifier is the time or a representation of the time that the snapshot was created. In another example embodiment, the snapshot identifier is an identifier that indicates a correspondence with a related snapshot.

In some example embodiments, a snapshot system maintains at least three volumes: source, target, and journal. The source volume may store data from hosts, and snapshots of data on the source volume may be replicated to the target and journal volumes. The target volume may contain one or more point-in-time images of the data to be replicated that is stored in the source volume. The journal volume may log data changes made from the point in time of the snapshot image in the target volume. When data need to be restored up to a specific point in time, the incremental changes from the journal volume may be used to update the snapshots from the target volume up to the specified time. The journal volume may be a sequential system, so that once a specific point in time is indicated, every item that is stored before or after in the journal volume may be used to update the snapshot from the target volume, as if the target volume snapshot is rolled backward or forward.

A volume, as used herein, may be a logical unit or a logical extent (e.g., a logical or virtual device) mapped to one or more physical volumes or physical extents (e.g., hard disk partitions) of a storage system. The logical storage unit may receive data placed by hosts via file systems, database management systems, or other systems or processes. In the storage system, hosts may not address the disk drives of the storage systems directly. Instead, access to data may be provided to the hosts from what the hosts view as a plurality of logical devices or logical volumes (LVs). An LV or LUN (logical unit number) may be used to refer to the foregoing logically defined devices or units. The LVs may or may not correspond to the actual physical disk drives. For example, one or more LVs may reside on a single physical, logical, or virtual storage device or multiple partitions located on one or more physical, logical, or virtual storage devices.

Illustrated in FIG. 1 is a diagram of an example system used to generate snapshot maps for storage system management. Applications on one or more hosts 140-144 may perform input/output (I/O) operations, such as writing data to a source storage 120 and/or reading data from the source storage 120. In some example embodiments, during a snapshot backup, the source storage 120 is paired with one or more devices from the target device group 130 are paired, so that the source storage 120 may be used for routinely accessed information, and the one or more devices from the target device group 130 may be used to provide redundant or archival storage. The target device group 130 may be configured to include different types of snapshot storage, such as snapshot storage clone 132, snapshot storage SNAP 134, and/or snapshot storage other 136, among others. Each type of snapshot storage may be configured for storing backup data generated according to a snapshot method. For example, the snapshot storage clone 132 may be configured, provisioned, and used as storage for backup data generated by clone method. Similarly, the snapshot storage SNAP 134 may be configured, provisioned, and used as storage for backup data generated by SNAP method. The methods and systems to intelligently choose a target device for pairing based on a given snapshot method are outlined in U.S. patent application Ser. Nos. 13/841,234, 13/841,717, 13/842,710, and 13/843,109, incorporated by reference in their entirety herein.

Although snapshot storages 132-136 are illustrated in FIG. 1 as being in a different data storage location from the source storage 120, it should be appreciated that snapshot storages 132-136 and source 120 may be located in and controlled by separate systems, or may be located within and controlled by the same system 100. Data may be located in same or different systems, which may be physically within the same physical enclosure, or may be located in different physical enclosures operatively connected by the communication link 105 and the network 110 via a logical or physical connection. Further, during snapshot backups, a device used at one point-in-time as the source storage 120 may be reconfigured and used as a target device within the target device group 130 at a different point-in-time. Conversely, a device configured within the target device group 130 and used at one point-in-time for storing snapshots may be used as the source storage 120 for storing production data at a different point-in-time.

The source storage 120 may include one or more storage devices of an array. These devices may be, for example, disk devices of the array that store data on one or more types of media, including magnetic, optical, or other type of media used for storing data. In this respect, it should be appreciated that the production data stored in the storage system 100 is ultimately stored on one or more physical disks in the source storage array 120, but the interface presented to the hosts 140-144 for accessing the production data is the one or more file systems 170. Connecting the file system 170 and the physical disks of the source storage 120, the volume layer 172 may include one or more logical units (LUN) for organizing storage space into logical volumes of data blocks. LUNs within the volume layer 172 may provide mapping to physically provisioned storage space in the physical disks that make up the source storage array 120.

In some example embodiments, data in the system 100 is organized and accessed through a multi-layered storage stack. The arrangement of the storage stack may be implemented by some or all of the components in FIG. 1. For example, at the top-level of the storage stack is a file system layer 170. The file system layer 170 may serve to organize the data. Using the file system layer 170, hosts 140-144 may share access to data stored on the source storage 120. Each of the hosts 140-144 may be operatively coupled to one or more file systems within the file system layer 170. The hosts 140-144 may communicate via the communication link 105 and the network 110 with the source storage 120 using suitable protocols. The file system layer 170 may provide procedures to store, retrieve, and update the data, and manage the available space on the storage devices of the source storage 120. Various file systems and protocols may be provided by different vendors. Examples of the file system layer 170 protocols include NFS for systems employing the UNIX operating system and CIFS for systems employing the WINDOWS® operating system available from Microsoft Corporation. In addition to NFS and CIFS, other protocols may also be used as part of the native or virtual file system layer 170.

Below the file system layer 170 may be a volume layer 172. The volume layer 172 operatively coupled to the file system layer 170 may implement a form of storage virtualization. The volume layer 172 may map physical volumes or "physical extents" (e.g., hard disk partitions or logical unit numbers) to logical units. Disk devices of the source storage 120 may be arranged into one or more data storage areas, referred to in the art as volumes that are accessed by the hosts 140-144 via the file system layer 170. Each volume may be represented by a LUN. For example, a volume on the source storage 120 is represented and referred to by a source LUN. Similarly, a volume on target storages 132-136 may be represented and referred to by a target LUN. Each volume may reside on a single physical, logical, or virtual device or multiple partitions located on one or more physical, logical, or virtual storage devices.

In some example embodiments, disk devices of source storage 120 and target storages 132-136 are part of storage arrays. Although snapshot storages 132-136 are illustrated in FIG. 1 as being in a different data storage location from the source storage 120, it should be appreciated that snapshot storages 132-136 and source 120 may be located in, hosted and controlled by separate storage arrays, or may be located within, hosted and controlled by the same storage array. Each array may be associated with an array identifier. One or more operating systems may be running on each array. And each operating system may be associated with an operating system version number.

Different version operating system may include different device drivers 174. The device drivers 174 may be operatively coupled to the volume layer 172 and located below the volume layer 172 in the storage stack. The device drivers 174 may provide volume layer 172 access to the storage array disk devices. The access method may determine the availabilities of snapshot methods. For example, a new version operating system includes device drivers that allow SNAP, VNX_SNAP, and CLONE snapshot methods, while a prior version operating system includes device drivers that allow less snapshot methods, such as SNAP and CLONE.

A backup server 150 may be part of the storage system 100 to manage backups including configurations of the hosts 140-144, the source storage 120, the target device group 130, and the storage stack for snapshots. The backup server 150 may be a computer system having at least a display and a selection device and connected to the storage system 100 via the communication link 105 and the network 107. The display may be provided by a management console 159 GUI. Through the management console 159 GUI, snapshot maps and storage system configurations may be presented to a user and inputs from the user may be collected from the selection device signal. In some example embodiments, the backup server 150 is NETWORKER®, a product available from EMC Corporation, Hopkinton, Mass.

The management consoles 159 may display storage system configuration to a user through a GUI and/or collect user input from signals sent from the selection device. The GUI may display a plurality of widgets, each for example with icons, graphs or texts representing the storage components. The widgets are associated with snapshot characteristics, for instance, a host identifier associated with the host 140, a file system name associated with a file system located in the file system layer 170, a source LUN associated with the source storage 120, an array identifier associated with an array hosting the source storage 120, an operating system version number associated with the operating system running on the array, a snapshot method name associated with a snapshot method provided by device drivers 174, and a target LUN associated with a target storage in the target device group 130, among others. Linkages connecting the widgets may also be displayed to show the connections, relationship, and/or associations among various components of the system 100.

In some example embodiments, the backup server 150 may include a selection engine 151, an analyzer 152, a report engine 154, and a snapshot map database 156. The selection engine 152 may provide an interface to a user in order to receive from the user a set of selection criteria. Based on the set of selection criteria the report engine 154 may generate a snapshot map including pairings of the source storage 120 and the devices in the target device group 130. The snapshot map may be time stamped and stored in a snapshot map database 156. The stored snapshot map may then be retrieved and displayed by the report engine 154. A pictorial representation of the snapshot map is further illustrated in FIG. 2. Although FIG. 1 shows various modules associated with the backup server 150, fewer or more modules may be associated with the backup server 150 and still fall within the scope of various embodiments.

Figure 10:
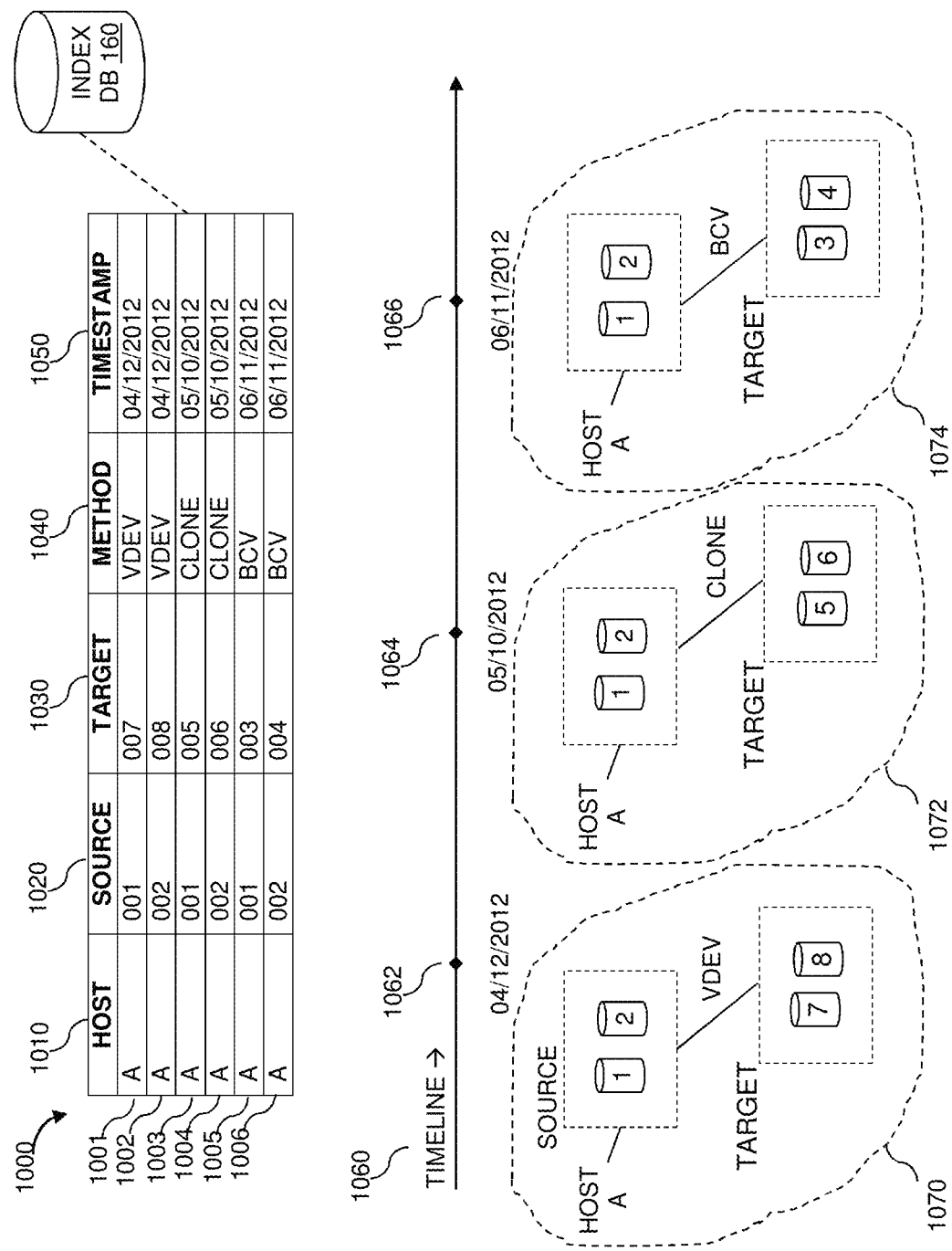
FIG. 10 is a schematic diagram illustrating generating an example snapshot history map based on snapshot details stored in an index database.

In some example embodiments, an index database 160 may be operatively coupled to the backup server 150. The backup server 150 may initiate snapshot backups and after performing successful snapshot backups, the backup server 150 may store snapshot details in the index database 160. The snapshot details stored by the index database 160 may include LUNs of the source and target storage, version numbers of the file systems, array identifiers, the operating system running on the source storage 120, the snapshot method, and a timestamp indicating the snapshot backup time, among others. The snapshot details stored in the index database 160 may be purged by administrators. By querying the index database 160, snapshot details may be obtained and a snapshot history may be generated based on a list of the snapshot details. A pictorial view of the snapshot history may be displayed via the GUI as a snapshot history map. Examples of the snapshot history map are shown in FIG. 10. Though FIG. 1 illustrates the index database 160 as external to the backup server 150, the index database 160 may reside and operate or to be operated as part of the backup server 150.

The communication link 105 and the network 107 may provide connectivity among various components of the system 100 and may be implemented using the protocols such as TCP/IP, or some other logical or physical connection. Hosts 110-114 may be operatively connected to and communicate with other components of the system 100 through the communication link 105 and the network 107. Similarly, the backup server 150, the source storage 120 and the target device group 130 may be operatively connected to and communicate with other components of the system 100 through the communication link 105 and the network 110. The communication link 105 and the network 110 may also be implemented to provide support for various storage architectures such as Storage Area Network (SAN), Network-Attached Storage (NAS), Direct-Attached Storage (DAS), etc. Typical networks used to transfer data between hosts and storage systems include Fibre Channel, SCSI, Ethernet, Gigabit Ethernet, and other types of communication networks.

Figure 2:
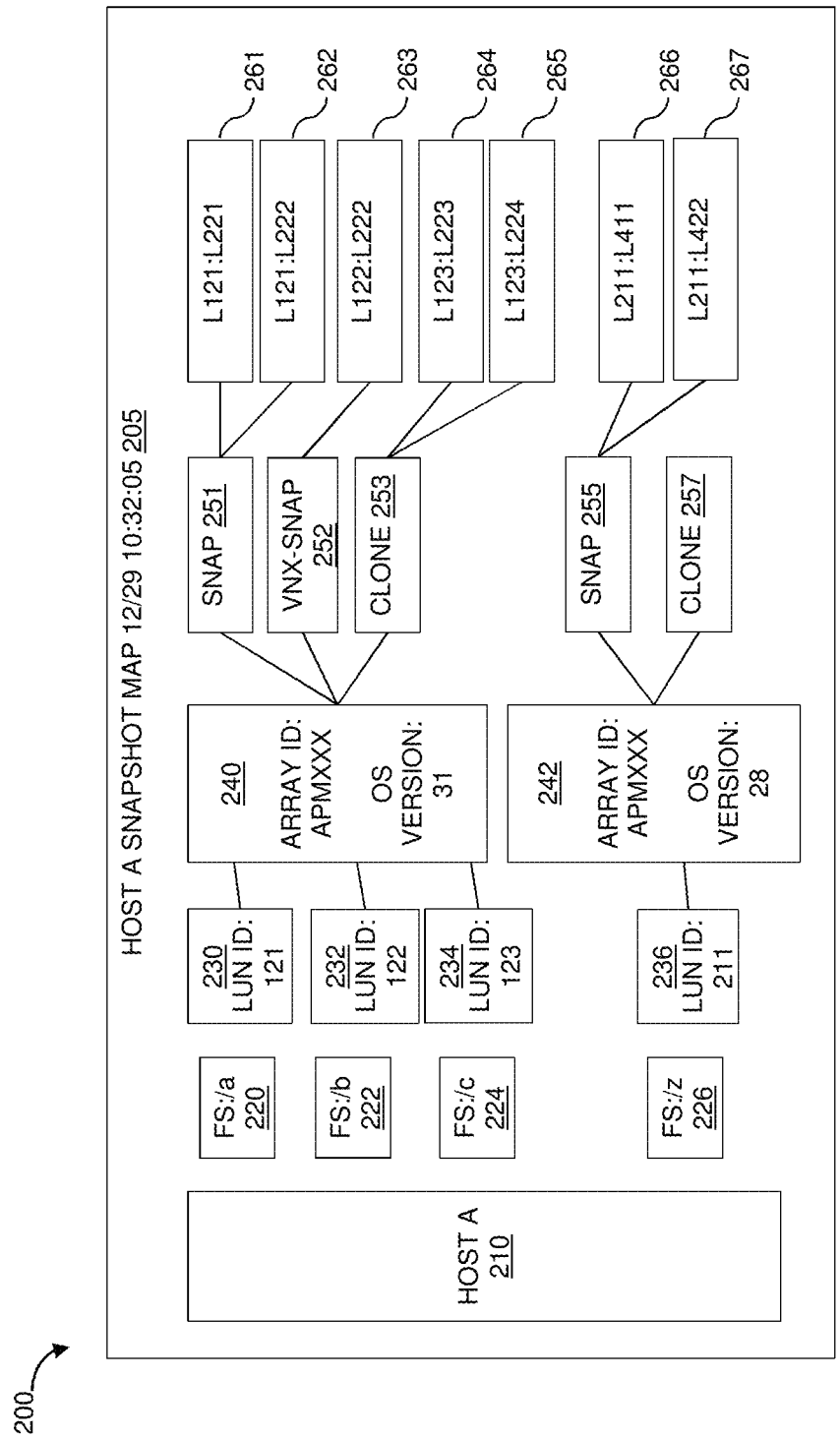
FIG. 2 is a diagram of an example snapshot map.

FIG. 2 is a diagram of an example screen display 200 of a snapshot map that may be displayed on, for example, the management console 159 GUI. The management console 159 GUI may have different display areas. For example, one display area is used to display a snapshot map; another display area is used to display a configuration panel; and a third display area is used to display a snapshot history map. Despite the division of different display areas, the snapshot map display area, the configuration panel display area, and the snapshot history map display area are part of one display by the management console 159 GUI. Those skilled in the art will appreciate that the formats for the display are not limited to those presented herein.

In the screen display 200, widgets may be displayed representing various storage system components. The widgets may represent components, such as a host, a source storage, a target storage, a snapshot method available to an operating system running on an array hosting the source storage, a file system in a storage stack, a source LUN operatively coupled to the file system in the storage stack, an array hosting the source, the target storage for pairing with the source storage, among others. A widget may have a graphical component, such as an icon or a graph, and/or a text component. A user can perform administrative operations on a storage system component through operations on its associated widget. For instance, the user can click an icon representing a host to obtain snapshot characteristics associated with the host and configure the snapshot characteristics. Many widgets are moveable within the management console 159 GUI. For instance, an icon may be dragged and dropped, therefore moved from one area of the GUI display to another area of the GUI display. The dragging may obtain the snapshot characteristics associated with the moved widget. And the dropping may pass the snapshot characteristics to the receiving area of the GUI.

In addition to widgets, the example display 200 may also show linkages connecting the widgets. The linkages may be shown as lines connecting the widgets to represent the relationship and/or association among storage components. For example, in FIG. 2, lines between source storages 230-234 with LUN 121-123 and an array 240 with an array identifier APMXXX and an OS version number 31 represent three source storage volumes 230-240 hosted by the array 240. Similarly, lines between the array 240 and the snapshot methods 251-253 may represent that the operating system with version number 31 running on the array APMXXX provides snapshot methods SNAP 251, VNX-SNAP 252, and CLONE 253. Lines between the array 242 and the snapshot methods 255-257 may represent that the operating system with a low version number 28 running on the same array APMXXX provides less snapshot methods, such as SNAP 255 and CLONE 257. And lines between the snapshot method 251 and the pairings 261-261 may represent that the source storage 230 with LUN 121 is paired with two target storages with LUN 221 and 222 respectively using the snapshot method SNAP denoted as 251. In some example embodiments, the linkage is shown implicitly by displaying related widgets close to each other. In FIG. 2, the host A 210 and the file systems 220-226 widgets are displayed close to each other in order to represent the host A 210 is operatively coupled to the file systems 220-226 and uses the file systems 220-226 to access data stored on the source storage 230-240.

The snapshot map 205 may be used to facilitate snapshot backup management. As illustrated in FIG. 2, snapshot characteristics of storage components may be displayed in the widget text. The snapshot characteristics may include, the name of the host A 210, the source LUN, the array identifier, the operating system version number, the snapshot method name, and the target LUN paired with the source LUN, among others. Additional snapshot characteristics may be displayed upon selecting the widgets. Relative to conventional approach of locating snapshot characteristics at various places in the storage system 100, the snapshot map 205 provides a view of snapshot characteristics in one central location, therefore is more efficient.

In addition, the snapshot map 205 provides a view that closely resembles the topology of the storage system 100 snapshot configuration. For example, from left to right, the snapshot map 205 may presents the host 210, the file systems 220-226, the source LUNs 230-236, the arrays and the operating systems 240-242, the snapshot methods 251-257, and the target LUNs for pairings 261-267 in a layered view. The view closely resembles the structural arrangement of the storage components, and the hierarchical layers of the storage stack layers. The display of the snapshot map 205 on the management console 159 GUI thus allows managing and configuring the storage system 100 more intuitively.

In some example embodiments, a set of selection criteria is applied to the snapshot map 205, and the snapshot map 205 is displayed interactively based on the criteria. For instance, the selection engine 151 initially receives an identifier associated with the host A 210. Without specifying other criteria, the set of selection criteria may be defaulted to include the file systems 220-226 operatively coupled to the host A 210, the source LUNs 230-236 operatively connected to the host A 210, the arrays 240-242 hosting the source LUNs 230-236, and the snapshot methods 251-257 available to the arrays 240-242. Applying the methods outlined in U.S. patent application Ser. Nos. 13/841,234, 13/841,717, 13/842,710, and 13/843,109, available target LUNs paired with the source and the selected host may be obtained, and the pairings 261-267 may be displayed.

Prior to and/or after displaying the snapshot map 205, more selection criteria may be specified and applied to the snapshot map 205 as filters. For instance, in addition to the host A 210 identifier, the selection engine 151 also receives the file system name z as part of the set of selection criteria. The set of selection criteria may be applied to the snapshot map 205 to filter out the display of file systems 220-224. After applying the filter, the file system 226, the source storage 236 with LUN 211, the array 242 with array identifier APMXXX and operating system version number 28, the snapshot methods 255-257, and the source and target pairings 266-267 may remain in the display.

Though FIG. 2 shows the example snapshot map 205 having components the host 210, the file systems 220-226, the source LUNs 230-236, the arrays 240-242, the snapshot methods 251-257, and the pairings of source and target LUNs 261-267, the snapshot map 205 may include other components related to snapshot backup management. For example, when virtual layers are added to the storage stack, components used in the virtual layers may be included in the snapshot map 205.

In some example embodiments, after generating the snapshot map 205 based on a set of selection criteria, the snapshot map 205 may be time stamped and stored in the snapshot map database 156. By queries, the snapshot map 205 may be retrieved from the snapshot map database 156 and displayed in the management console 159. As illustrated in FIG. 2, the top of the example snapshot map 205 may have a description of the snapshot map 205. The description may include one or more criteria from the set of selection criteria and the timestamp associated with the snapshot map 205 generation, e.g., Host A Snapshot Map December 29 10:32:05.

Figure 3:
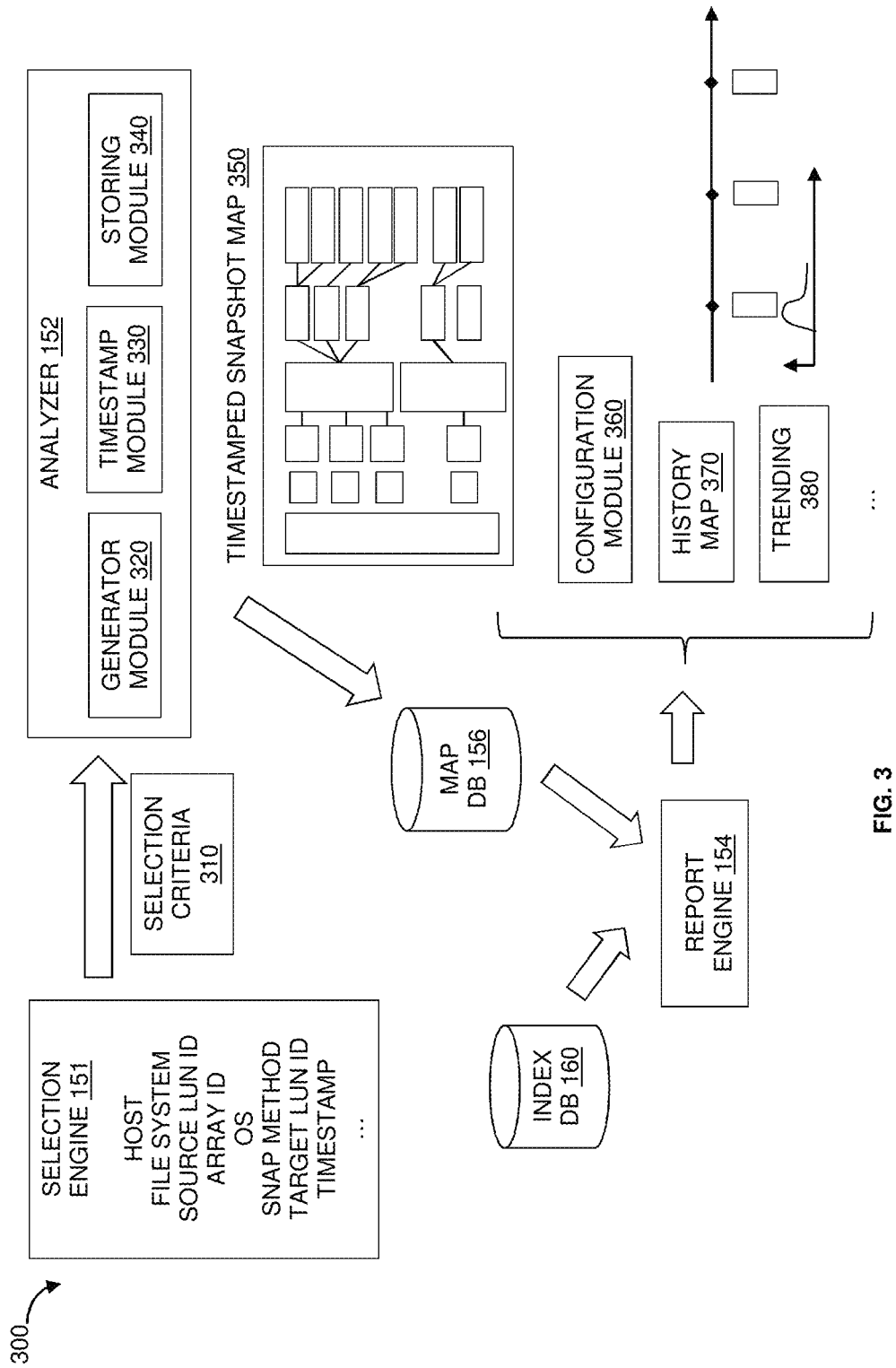
FIG. 3 is a diagram of an example system illustrating generating a snapshot map and using the snapshot map for storage system management.

Illustrated in FIG. 3 is a diagram of a system 300, according to an example embodiment, illustrating generating a snapshot map and using the snapshot map for storage system management. Shown in FIG. 3, the selection engine 151, residing on the backup server 150 may receive a set of selection criteria 310 and send the set of selection criteria 310 to the analyzer 152. The set of selection criteria 310 may include at least one of a host identifier associated with the host, a file name associated with a file system, a logical unit number (LUN) associated with the source storage, an array identifier associated with an array, an operating system version number associated with an operating system, and a snapshot method name associated with a snapshot method.

For instance, a user specifies a host identifier in the set of selection criteria 310. Absent other criteria, a snapshot map for the host may be generated based on the host identifier. The generated snapshot map may include source storages operatively connected to the host for storing production data, target storages in a storage pool that may be paired with the source storages for storing snapshots of the source storages, and snapshot methods available for performing snapshots of the source storages. Components in a storage stack between the host represented by the host identifier and the source storages may also be included in the snapshot map. In addition to the host identifier, the user may also specify other criteria, such as one or more file systems, one or more arrays, or one or more snapshot methods, among others.

Upon receiving the set of selection criteria 310, a generator module 320 that resides on the analyzer 152 may generate a snapshot map based on the set of selection criteria 310. The snapshot map may then be time stamped by a timestamp module 330 and stored by a storing module 340 in the snapshot map database 156. Both the timestamp module 330 and the storing module 340 are located on the analyzer 152. The time stamped snapshot map 350 may then be retrieved by the report engine 154 and displayed. The time stamped snapshot map 350 may also be used in trending analysis 380, since the time stamped snapshot map 350 provides a view of storage system configurations for snapshot backup at a point-in-time. When the configurations change at a different point-in-time, the snapshot map 350 may be re-generated, time stamped, and stored in the snapshot map database 156. Trending of the snapshot maps may illustrate system configuration changes over time. Several benefits may be provided by storing time stamped snapshot maps in the snapshot map database 156.

First, saving the snapshot map 350 may conserve system resources. Generating the snapshot map 350 may consume significant system resources. For instance, storage arrays hosting the source storage 120 need to be queried in order to obtain file system names, source LUNs, array identifiers, operating system version numbers, snapshot methods names, and target LUNs, among others. Instead of querying the arrays each time a snapshot map is requested, retrieving from the snapshot map database 156 and displaying a previously generated snapshot map may save resources for storage array operations, such as production data input/output and production data backups.

Second, the stored snapshot maps may be reused for storage system configuration. In a production environment, the snapshot configurations may not change frequently. Often, configurations for production storage arrays stay the same until system maintenance and/or upgrade. When the configurations remain the same, the depiction of the storage system in the snapshot map 350 reflects the up-to-date storage system configuration, and may be reused to facilitate storage system management. Thus, the snapshot maps stored in the snapshot map database 156 may be reused multiple times for storage system configuration. Reusing a previously generated snapshot map conserves system resources and improves system performance.

The snapshot map 350 may be used to facilitate storage system management. Once the snapshot map 350 is provided by the report engine 154 on management console 159 GUI, one or more configuration modules 360 residing on the backup server 150 may allow the user to configure snapshots using the pictorial view. Such configurations may include configuring a host, source storages, target storages, and storage stack layers. After the configuration, snapshots may be taken and details related to the snapshots may be generated by the backup server 150 and stored in the index database 160. The report engine 154 may then use the data stored in the snapshot database 156 and the index database 160 to generate reports, such as a snapshot history map 370 and trending reports 380, among others.

Figure 3A:
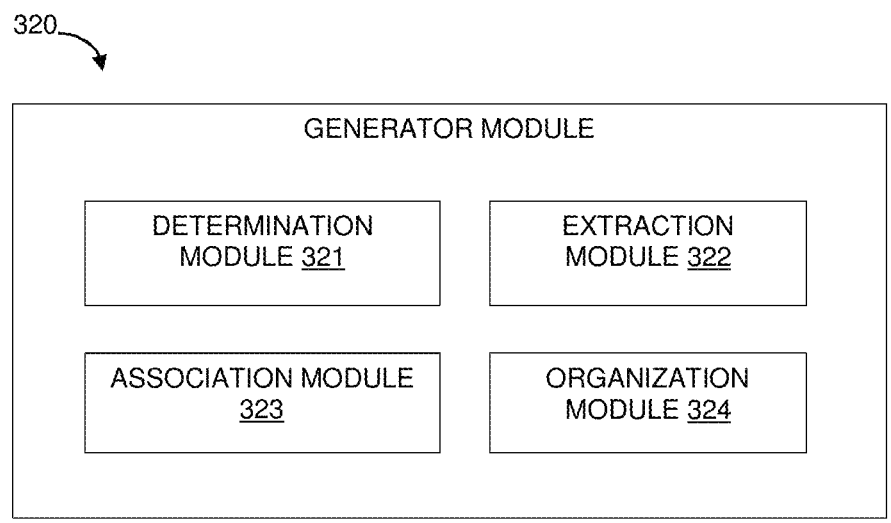
FIG. 3A is a diagram of an example generator module used to generate a snapshot map.

FIG. 3A is a diagram of an example generator module 320, that resides on the analyzer 152, used to generate a snapshot map. The generator module 320 may include a determination module 321, an extraction module 322, an association module 323, and an organization module 324. In order to generate a snapshot map, the determination module 321 may first receive a set of selection criteria from the selection engine 151. Upon receiving the set of selection criteria, the determination module 321 may determine that at least one of the file system, the source storage, the array, the operating system, or the snapshot method is selected as the set of selection criteria. In case a user selects a host and requests to generate a snapshot map for the host, absence other selection criteria, the set of selection criteria may default to file systems, source storages, arrays, operating systems, and snapshot methods configured for the host.

Based on the initial set of selection criteria, the selection engine 151 may query the storage system using standard API's in order to obtain other criteria based on the selection. Once a complete set of selection criteria is established by the selection engine 151, the extraction module 322 may extract target LUNs representing at least one target storage using the methods outlined in U.S. patent application Ser. Nos. 13/841,234, 13/841,717, 13/842,710, and 13/843,109. After obtaining the target storage LUNs, the association module 323 may associate the at least one target storage LUNs with the set of selection criteria. The snapshot map may then be generated and organized by the organization module 324 based on the set of selection criteria.

For instance, a user requests to generate a snapshot map for a selected host. A host identifier representing the selected host may be received by the determination module 321 as the selection criteria. Upon a determination by the determination module 321 that the selection criteria may not include at least one of the file system, the source storage, the array, the operating system, or the snapshot method, based on the host identifier, the selection engine 151 may first query the storage system in order to obtain name of the file systems operatively coupled to the host. The file systems may be part of the storage stack providing access to data on the source storages. The file systems obtained may then be selected into the set of selection criteria by the selection engine 151. Following the file systems selection, the selection engine 151 may query the storage system to obtain source LUNs representing source storages that are operatively connected to the host and are part of the storage stack containing the file system. The selection engine 151 may further query the storage system in order to obtain an array identifier representing the array hosting the source storages and the operating system version number representing the operating system running on the array hosting the source LUNs. Based on the operating system version number, snapshot methods available to the device drivers in the version of the operating system may also be obtained by the selection engine 151.

Having formed a complete set of selection criteria including the host identifier, the file system names, the source LUNs, the array identifier, the operating system version number, and the snapshot methods, the extraction module 322 may apply the methods outlined in U.S. patent application Ser. Nos. 13/841,234, 13/841,717, 13/842,710, and 13/843,109 to obtain at least one target storage LUN. The at least one target storage LUN may then be associated with the complete set of selection criteria by the association module 323. And the organization module 324 may organize the snapshot map based on the association of the host identifier, the file system name, the source LUNs, the array identifier, the operating system version number, the snapshot methods, and the at least one target LUN. As shown in FIG. 2, the snapshot map 205 may be organized and displayed from left to right including the host, the file systems, the source LUNs, the array, the operating systems, the snapshot method, and the target LUN pairings.

In addition to the default host identifier as the selection criteria, more selection criteria may be included in the initial set of selection criteria. For example, the set of selection criteria initially include a host identifier, a file system name, source LUNs, and an array identifier. A snapshot map for the selected host, file system, source LUNs and the array may be requested. The selection engine 151 may obtain the operating system version numbers based on the array identifier and the source LUNs. The selection engine 151 may further obtain snapshot methods based on the operating system version number. Upon forming a complete set of selection criteria including the host identifier, the file system name, the source LUNs, the array identifier, the operating system version numbers and the snapshot methods, the extraction module 322 may apply the methods outlined in U.S. patent application Ser. Nos. 13/841,234, 13/841,717, 13/842,710, and 13/843,109 to obtain at least one target storage LUN. In case a complete set of selection criteria has been provided by the user, the extraction module 322 may extract the target LUNs based on the complete set of selection criteria received by the selection engine 151.

Figure 3B:
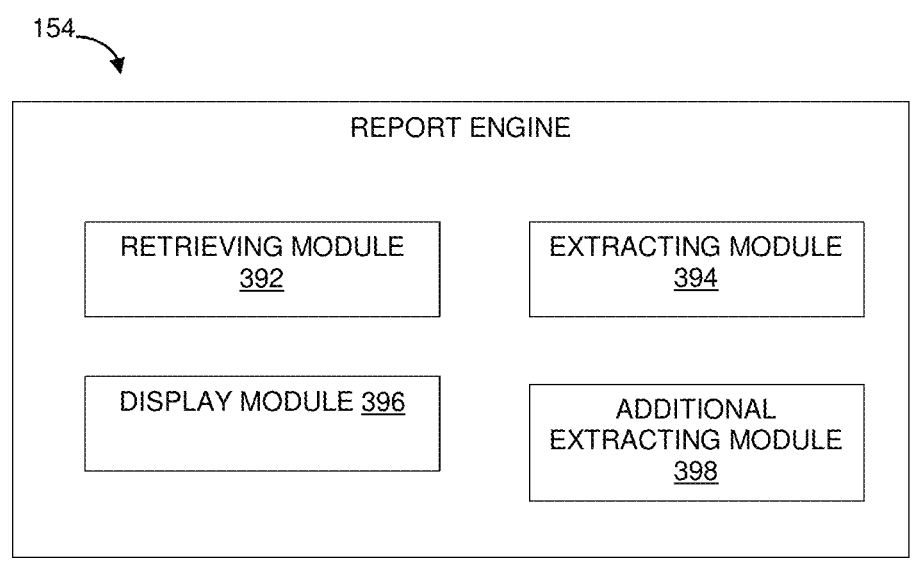
FIG. 3B is a diagram of an example report engine used to produce reports.

FIG. 3B is a diagram of an example report engine 154, that resides on the backup server 150, used to produce reports. The report engine 154 may include a retrieving module 392, an extracting module 394, a display module 396, and an additional retrieving module 398. After a snapshot map is generated, snapshot configurations may be performed using the snapshot map. Snapshots may then be taken based on the snapshot configurations. The backup server 150 may generate snapshot details after performing successful snapshots using configurations derived from the snapshot map. Reports may be generated using snapshot details and information from the snapshot map.

For example, from the snapshot map 205, the retrieving module 392 retrieves source and target storage pairings, denoted as 261-267 shown in FIG. 2. Based on the source and target storage pairings, the extraction module 394 may extract a snapshot history. In some example embodiments, the snapshot history may be stored on in the index database 160 as, for example, metadata. The additional extracting module 398 may extract the snapshot history of the at least one storage pairing by querying the index database 160. The snapshot history may include a list of snapshot details sorted in chronological order. And the display module 396 may display a chronological representation of the snapshot history as a snapshot history map based upon the snapshot details sorted in chronological order. An example of the snapshot history map is shown in FIG. 10.

Figure 4A:
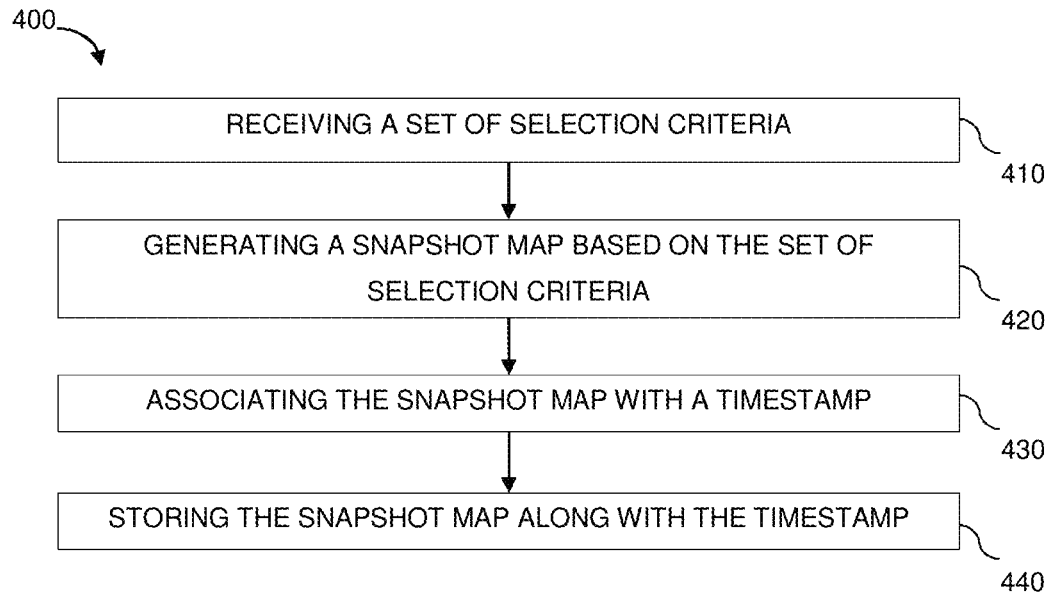
FIG. 4A is a diagram of an example computer implemented method executed to generate a snapshot map.

FIG. 4A is a diagram of a computer implemented method 400, according to an example embodiment, executed to generate a snapshot map. Illustrated are operations 410-440 that are executed by, for example, modules residing on the backup server 150. An operation 410 is executed by, for example, the selection engine 151 residing on the backup server 150 to receive a set of selection criteria. Upon receiving the set of selection criteria, an operation 420 is executed by, for example, the generator module 320 of the analyzer 152 residing on the backup server 150 to generate a snapshot map based on the set of selection criteria. Once the snapshot map is generated, an operation 330 is executed by, for example, the timestamp module 330 of the analyzer 152 residing on the backup server 150 to associate the snapshot map with a timestamp. Having time stamped the snapshot map, an operation 440 is executed by, for example, the storing module 340 of the analyzer 152 residing on the backup server 150 to store the snapshot map along with the timestamp in the snapshot map database 156.

Figure 4B:
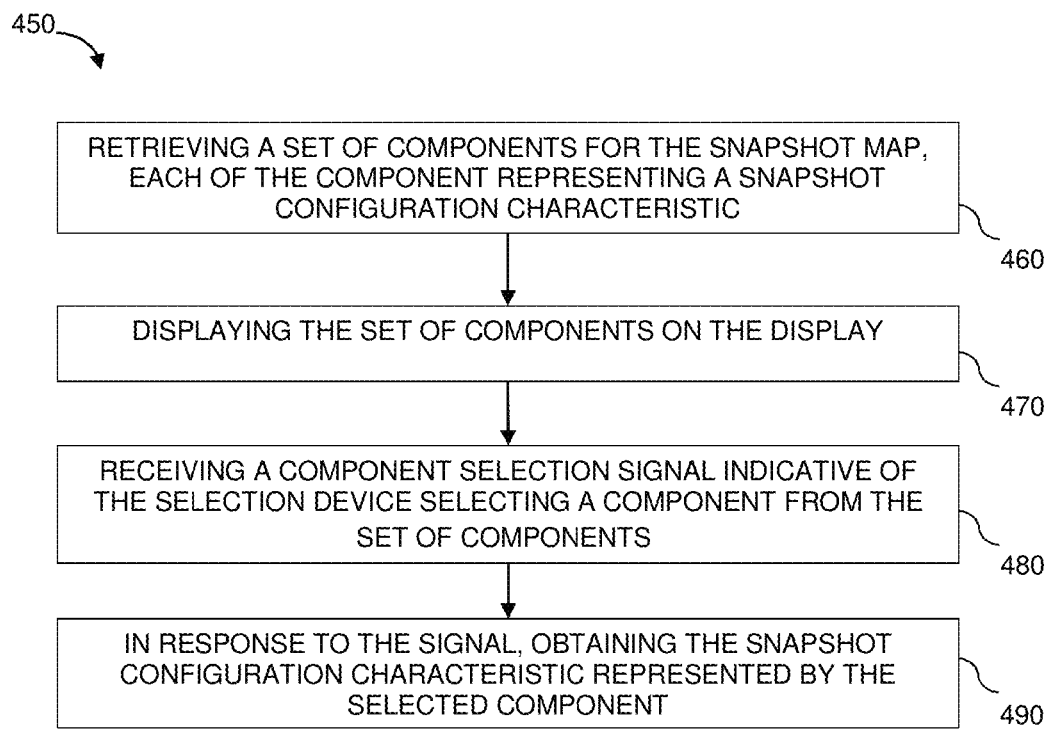
FIG. 4B is a diagram of an example method executed to display a snapshot map.

FIG. 4B is a diagram of a method 450, according to an example embodiment, executed to display a snapshot map on the management console 159 GUI. Illustrated are operations 460-490 that are executed by, for example, the backup server 150. The backup server 150 may be a computer system having at least a display and a selection device. The display may be provided by the management console 159 GUI. Through the management console 159 GUI, the snapshot map may be presented to a user and inputs from the user may be collected from the selection device signal. In order to display the snapshot map, an operation 460 is executed to retrieve a set of components for the snapshot map, with each component representing a snapshot configuration characteristic.

The set of components may include at least one of a host, a file system operatively coupled to the host, a source storage operatively connected to the host, an array hosting the source storage, an operating system running on the array, a snapshot method used to back up the source storage, and a target storage paired with the source storage using the snapshot method, among others. Similarly, the snapshot configuration characteristic may include at least one of a host identifier associated with the host, a file name associated with the file system, a source LUN associated with the source storage, an array identifier associated with the array, an operating system version number associated with the operating system, a snapshot method name associated with the snapshot method, and a target LUN associated with the target storage, among others.

Upon receiving the set of selection criteria, an operation 470 is executed to display the set of components on the management console 159 GUI. An example display of the snapshot map is illustrated in FIG. 2. As illustrated in FIG. 2, the snapshot map may be depicted as widgets representing the set of components and linkages among the widgets representing connections among the set of components. After providing the snapshot map to the user, an operation 480 is executed to receive a component selection signal indicative of the selection device selecting a component from the set of components. The selection device may be an input device configured as at least one of a physical or a virtual key pad, a touch pad, a stylus, a mouse, a trackball, an image sensor, a capacitive touch screen, a resistive touch screen, or a voice recognition sensor. In response to the component selection signal, an operation 490 is executed to obtain the snapshot configuration characteristic represented by the selected component.

Figure 5:
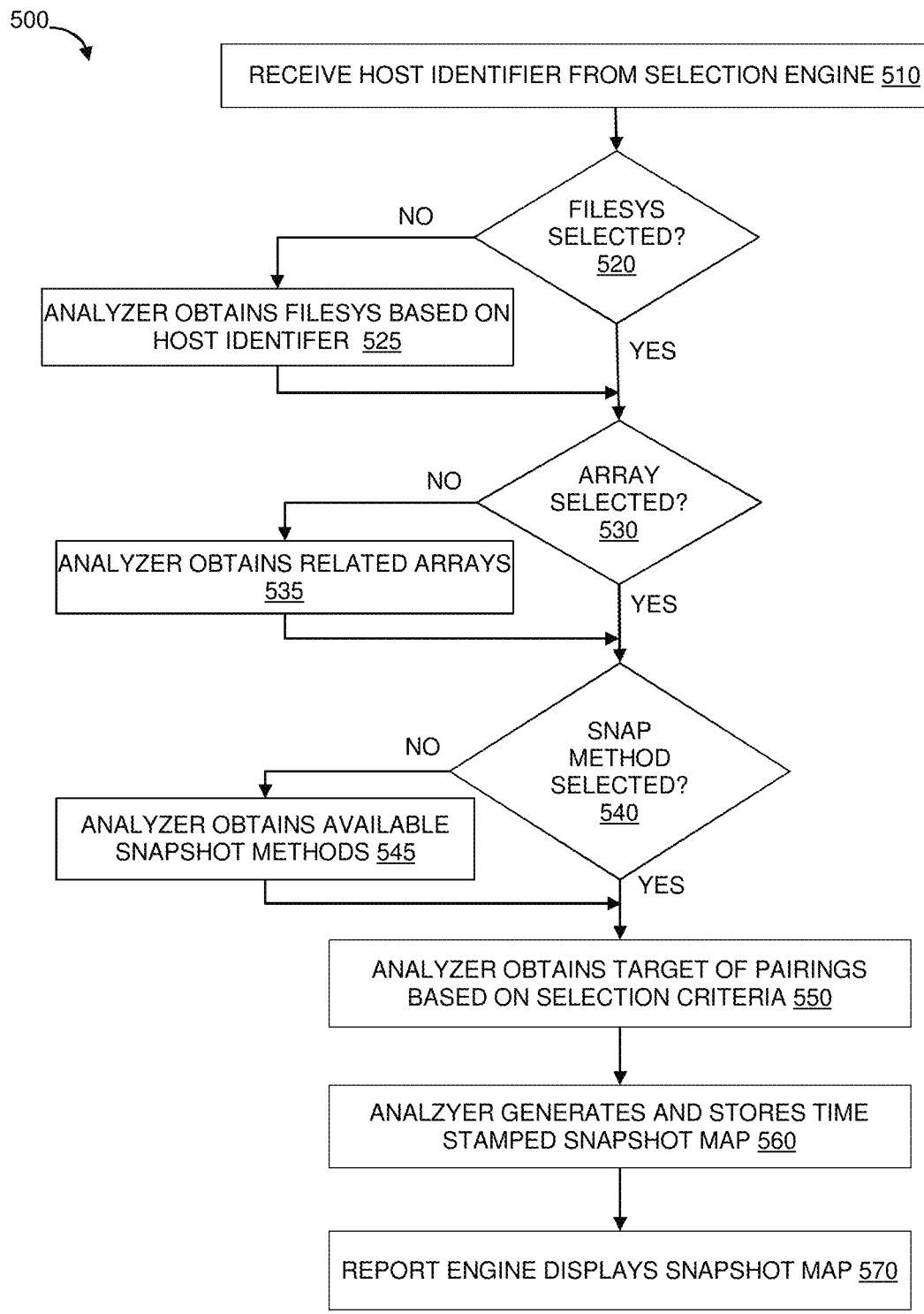
FIG. 5 is a flowchart illustrating the execution of an example operation to generate and display a snapshot map based on a set of selection criteria.

FIG. 5 is a flowchart illustrating an example method 500 executed by the backup server 150 to generate a snapshot map based on a set of selection criteria and display the snapshot map. Illustrated are operations 510-570 that are executed by, for example, the selection engine 151, the analyzer 152, and the report engine 154 residing on the backup server 150. A set of selection criteria may be received by the selection engine 151 based on a user selection. The set of selection criteria may be applied interactively as a filter to the snapshot map display prior to and/or after the snapshot map display.

An operation 510 is executed to obtain a host identifier associated with a host. The host identifier may be obtained upon a user's selection of a widget representing a host from the snapshot map display on the management console 159 GUI. Following the operation 510, a list of file systems operatively coupled with the host may be obtained. A decisional operation 520 is executed to determine within the set of selection criteria, whether the user has selected at least one file system. In case at least one file system has been selected, a decisional operation 530 is executed to determine whether the user has selected at least one array. In case no file system has been selected, an operation 525 is executed to select file systems operatively coupled to the host. Following the decisional operation 530 execution, in case at least one array is selected, a decisional operational 540 is executed to determine whether the user has selected at least one snapshot method. In case no array has been selected, an operation 535 is executed to select all arrays operatively coupled to the selected file systems. In some embodiments, the selection of the at least one array may include selecting at least one source LUN operatively coupled to the selected file system, and at least one array hosting the at least one source LUN selected, and at least one operating system running on the at least one array selected. Absent other criteria, the set of selection criteria may be defaulted to include a host identifier associated with the host, a file name associated with a file system, a LUN associated with the source storage, an array identifier associated with an array, an operating system version number associated with an operating system, and a snapshot method name associated with a snapshot method.

Once the set of selection criteria has been received by the selection engine 151, an operation 550 may be executed by, for example, the analyzer 152 to obtain at least one target storage based on the set of selection criteria. The at least one target storage may be paired with the selected source storage for snapshot backups of data generated by the selected host. The association of the target with the selection criteria may establish the organization of the snapshot map as illustrated in FIG. 2. An operation 560 is executed to generate the organized snapshot map, associate the map with a timestamp, and store the time stamped snapshot map in the snapshot map database 156. An operation 570 may be executed by, for example, the report engine 154 to retrieve and display the time stamped snapshot map.

Figure 6:
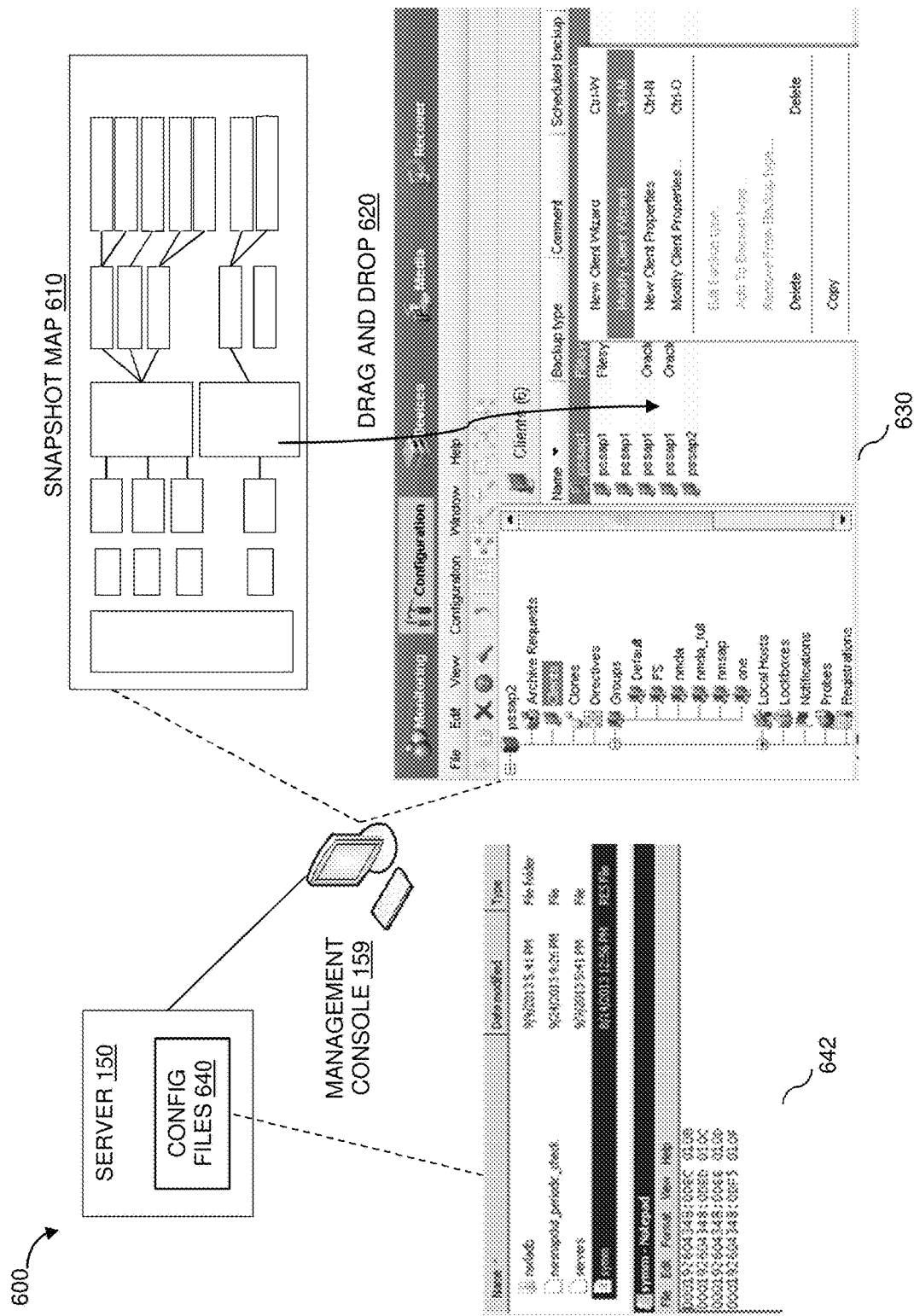
FIG. 6 is a diagram of an example system illustrating using a snapshot map to facilitate storage system configuration.

Illustrated in FIG. 6 is a diagram of a system 600, according to an example embodiment, illustrating using a snapshot map for snapshot configuration. During a backup configuration, a user may first enter select a host from a list of clients. A host may be a client that generates production data and stores the production data on storage arrays. Upon selecting the host, the host identifier may be received by the selection engine 151. The user may make further selections to refine the set of selection criteria and generate a snapshot map 610 according to methods illustrated in FIGS. 4A-4B and 5. The snapshot map 610 may then be displayed by the report engine 154. The snapshot map 610 may have selectable components. The selectable components may be clicked, highlighted, and so forth in order to select components from the snapshot map 610. The selected components may be dragged and dropped to a configuration panel. The configuration panel may be a part of the display area on the manage console 159 GUI. Upon dropping the selectable components, the configuration panel may receive snapshot configuration characteristics associated with the selectable components and use the configuration characteristics for the further configuration. Once the configuration is complete, resource files 640 may be generated automatically.

Conventional method of client backup configuration may involve a multiple-step configuration wizard. At each step, the user may enter snapshot properties such as choosing a file system to be backed up, the source storage array configuration, and the target storage array configuration. Manual configuration of system resource files, such as entering the long string of storage component identifiers may also be required for snapshot configuration. Such step-by-step approach including many user inputs is error prone. Relative to the step-by-step wizard and the manual input, the drag-and-drop approach is more intuitive and efficient. Configurations for multiple storage components may be conduct in one step. Further, the drag- and drop approach reduces the number of manual inputs. Following the drag-and-drop approach, the snapshot configuration characteristics may be obtained from selectable components on the snapshot map. In addition, the snapshot map has built-in validation. For example, after selecting a host, file systems that are operatively coupled to the selected host may be displayed on the snapshot map and available for further selection. Selecting a file system from the snapshot map ensures the file system is available to the host. And the system resource files may be automatically generated with less chance of error.

Figure 7:
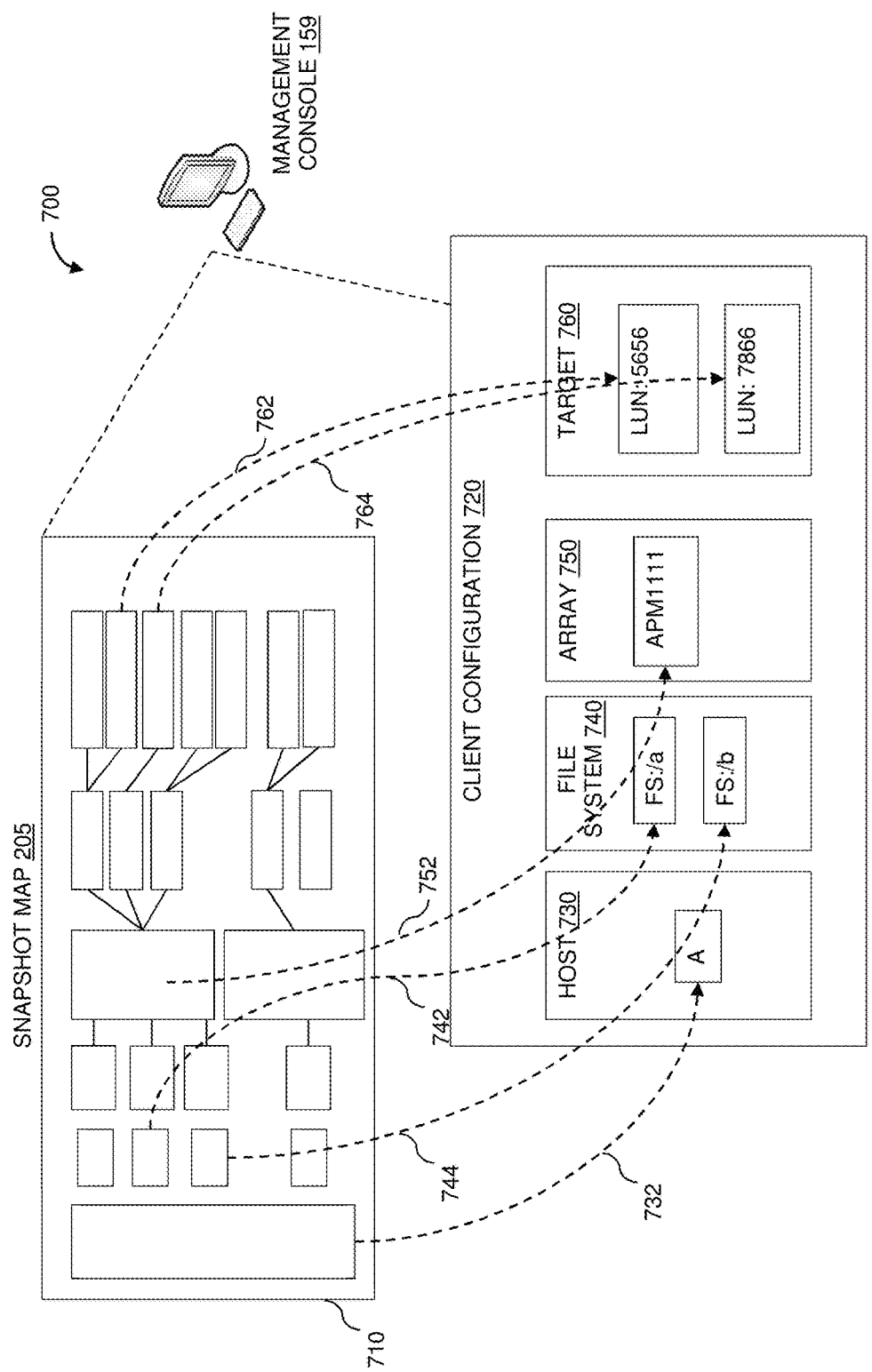
FIG. 7 is a screen display showing an illustrative user interface using a snapshot map to facilitate storage system configuration.

FIG. 7 is a screen display 700 showing, according to an example embodiment, an illustrative user interface using a snapshot map to facilitate snapshot backup configuration. The snapshot map 710 may have selectable components. Each selectable component may be displayed as a widget. A user may use a selection device to select one or more widgets representing one or more selectable components. The selected widgets may then be dragged off the snapshot map 710 and dropped to a client configuration panel 720. The client configuration panel 720 is part of the display area in the management console 159 GUI. Upon dropping the widgets to different the client configuration panel 720, snapshot configuration characteristics associated with the selectable components may be received and used for configuration tasks such as a client creation or a snapshot backup configuration.

For example, the user selects a widget representing a host using a mouse or other pointing device. The user may initiate a drag operation by pressing a button on the pointing device and while holding down the button, moving the pointing device away from the snapshot map. Upon the user initiating the drag operation, the backup server 150 may obtain the snapshot configuration characteristics, such as a host identifier representing the selected host. The user may continue to drag the selected widget from the snapshot map display area into the configuration area. Upon dropping the selected widget representing the host in the configuration area, the widget may be displayed in the configuration area, and the host identifier may be received by the configuration module.

Storage system management tasks may include configuring a client and/or snapshot backup configuration, among others. When configuring a client, in addition to selecting the host, the user may include additional components, such as one or more file systems operatively coupled to the host, into the set of selection criteria. In some example embodiments, the snapshot map 710 may be displayed interactively to facilitate the entering of file systems. For example, the snapshot map 710 initially displays components available to the host. The user may select one or more file systems from the snapshot map 710 to include additional criteria in the set of selection criteria. The set of selection criteria may be applied to the snapshot map 710 as a filter. The filtered snapshot map 710 may leave out irrelevant components, and the remaining components on the map 710 may be used for the configuration of the client and the selected file systems.

During a snapshot backup configuration, in addition to configuring the host and the file systems, the user may need to specify additional snapshot configuration characteristics, such as the source LUN to be backed up, the array for hosting the source LUN, the operating system version running on the array that may provide the suitable device drivers for various snapshot methods, and the target storage array that may be paired with the source storage array snapshot for snapshot backups, among others. Using the drag-and-drop approach, multiple snapshot configuration characteristics may be specified in one central location, therefore relative to the conventional step-by-step wizard, the drag-and-drop approach using the snapshot map is more efficient.

Figure 8:
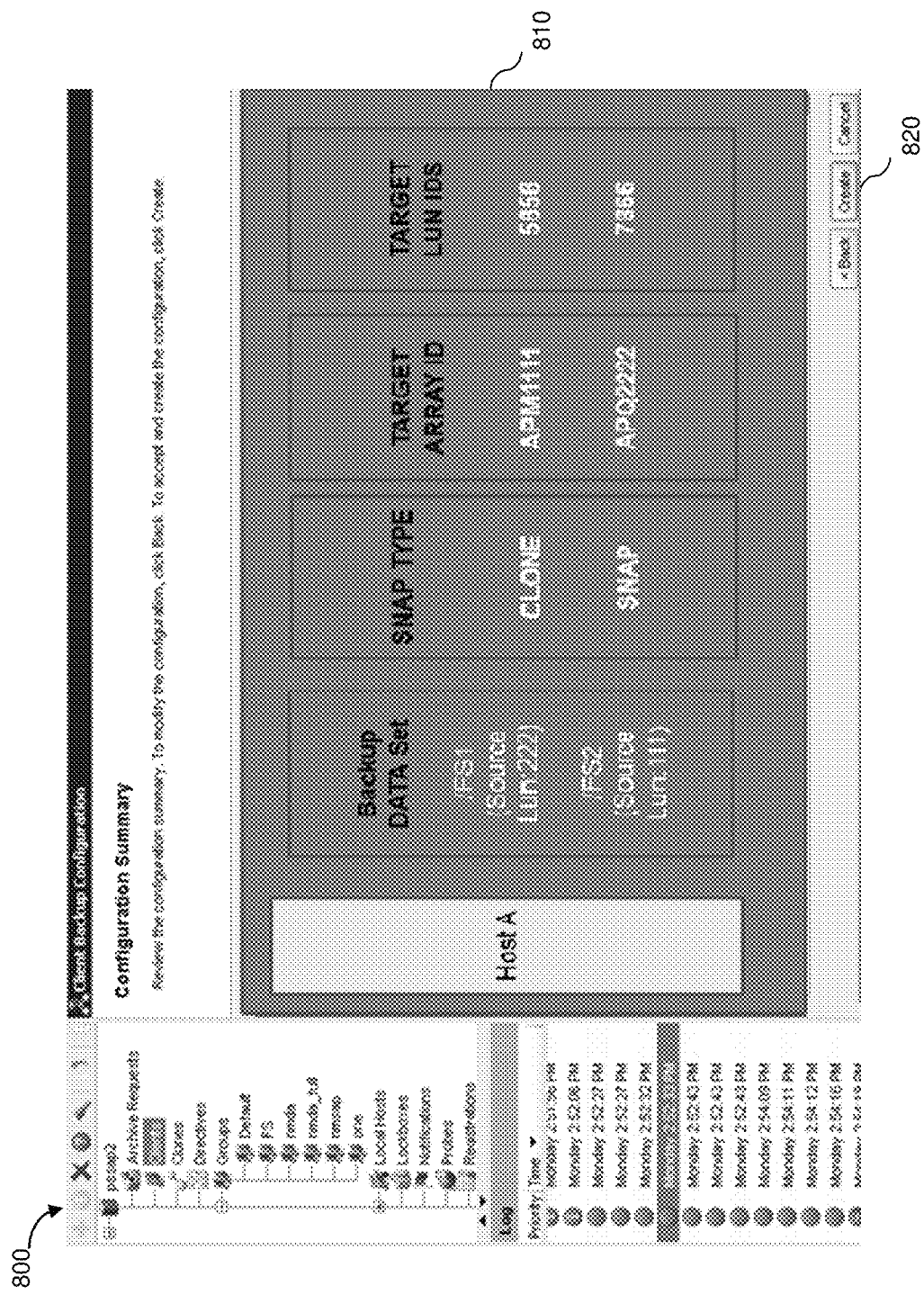
FIG. 8 is a diagram showing an example Graphical User Interface (GUI) illustrating a snapshot configuration screen.

Turning to FIG. 8, illustrated is a GUI 800, according to an example embodiment, illustrating a configuration screen of snapshot backup configuration using a snapshot map. After selectable components are dragged and dropped to the client configuration area 720, a configuration summary screen 810 may be displayed to review the configuration established based on the selection from a snapshot map. In some embodiments, the user may make changes to the configurations prior to confirming. Once the user clicks a create button 820, the configuration may be generated based on the details received. Also automatically generated may be system resource files, such as the system resource file 640 shown in FIG. 6. The arrangement, presentation, display, and/or subject matter described in connection with FIGS. 6-8 may vary and still remain within the scope of various embodiments.

Figure 9:
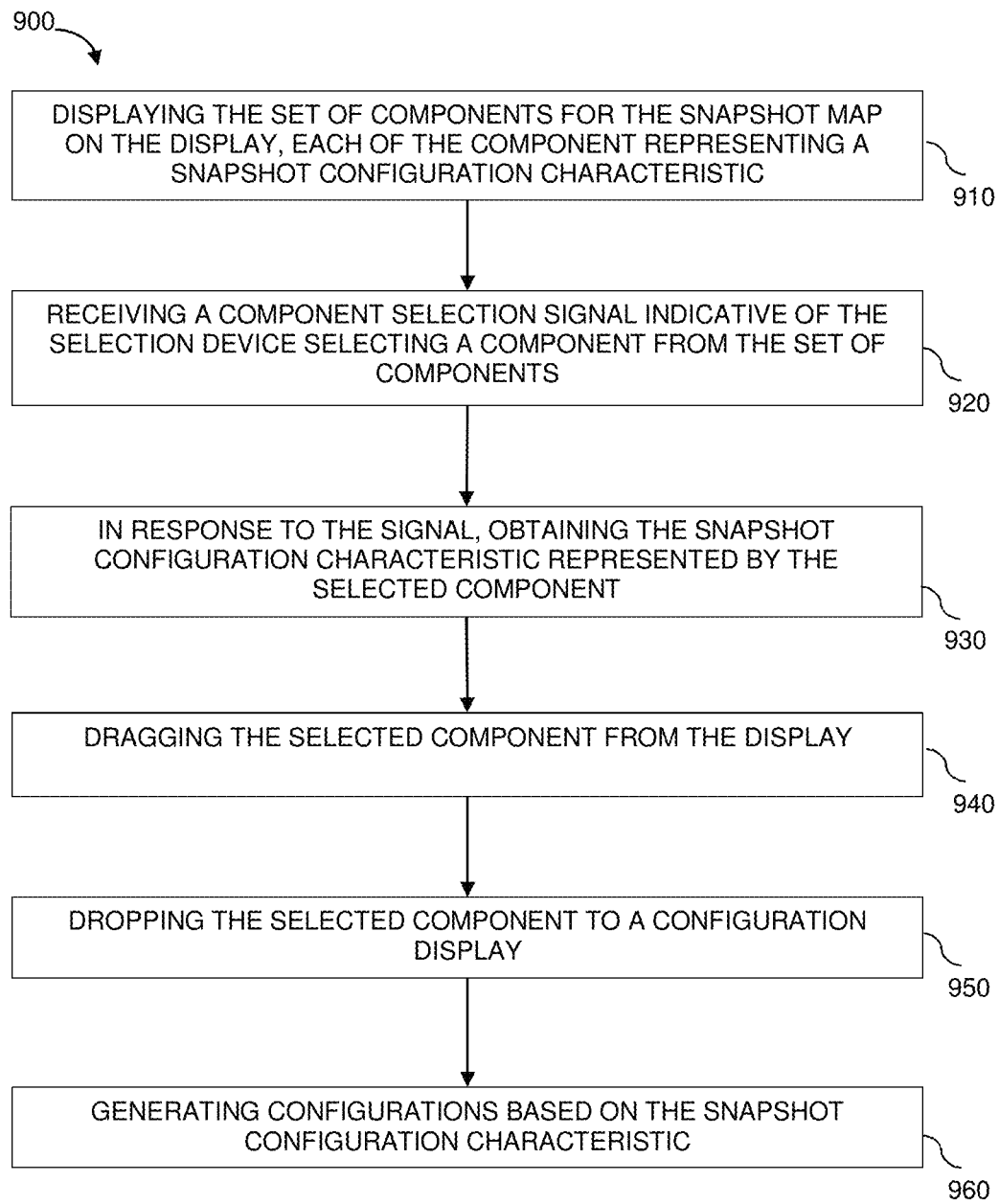
FIG. 9 is a diagram of an example method executed to configure snapshot backup using a snapshot map.

FIG. 9 is a diagram of a method 900, according to an example embodiment, executed to use a snapshot map for snapshot configuration. Illustrated are operations 910-960 that may be executed by, for example, the backup server 150. The backup server 150 may be a computer system having a display and a selection device. As illustrated in FIG. 1, the management console 159 may be operatively coupled to the backup server 150. The management console 159 may provide a GUI on its display. An operation 910 is executed to display the set of components for the snapshot map on the GUI, with each of the component representing a snapshot configuration characteristic. An example display of the snapshot map is illustrated in FIG. 2. As shown in FIG. 2, the snapshot map may be displayed as widgets representing the set of components and linkages among the widgets representing connections among the set of components. The connections may include at least one of a relationship between a host and a source storage, a relationship between a source storage and a snapshot method, and a relationship between a snapshot method and a target storage.

After providing the snapshot map, an operation 920 is executed to receive a component selection signal indicative of the selection device selecting a component from the set of components. The selection device may be an input device configured as at least one of a physical or a virtual key pad, a touch pad, a stylus, a mouse, a trackball, an image sensor, a capacitive touch screen, a resistive touch screen, or a voice recognition sensor, among others. In response to the component selection signal, an operation 930 is executed to obtain the snapshot configuration characteristic represented by the selected component. For example, on a resistive touch screen, a user points at a widget representing a host, selects the widget. In response to the selection signal, the backup server 150 may obtain a host identifier associated with the host. Other snapshot configuration characteristics may include a file name associated with a file system, a source LUN associated with a source storage, an array identifier associated with an array, an operating system version number associated with an operating system, a snapshot method name associated with a snapshot method, and a target LUN associated with a target storage.

Following the selection, an operation 940 is executed to drag at least one selectable component from the selectable components of the snapshot map display. An operation 950 is executed to drop the at least one selectable component to a configuration display. The drag-and-drop of selectable components allows the configuration display to receive snapshot configuration characteristics of the selectable components. Such characteristics may then be used in an operation 960 to generate configurations based on the snapshot configuration characteristic associated with the at least one selectable component. In some embodiments, the configuration display may further summarize the configuration and ask the user to confirm the configurations as shown in FIG. 8.

Once the configurations are complete for a snapshot backup, the backup server 150 may initiate snapshot backups using the configuration. After each successful snapshot backup, snapshot details may be stored in the index database 160. The index database 160 may later be used by, for example, the report engine 154 to generate a snapshot history.

FIG. 10 is a schematic diagram, according to an example embodiment, illustrating a snapshot history map 1060 generated by the report engine 154. The snapshot history map 1060 may be generated using snapshot details from the example table 1000 stored in the index database 160. The example table 1000 may include columns a host identifier 1010, a source LUN 1020, a target LUN 1030, a snapshot method name 1040, and a timestamp 1050. As shown in the example table 1000, six storage pairings denoted as 1001-1006 are used during snapshot backups on three different days, Apr. 12, 2012, May 10, 2012, and Jun. 11, 2012. The snapshot backups are taken for two source storages with LUNs 001 and 002 respectively. Both of source LUNs are operatively connected to a host A for storing production data generated by the host.

Record 1001 illustrates on Apr. 12, 2012, source LUN 001 may be paired with target LUN 007 during a snapshot backup using snapshot method of VDEV. Record 1002 illustrates on the same day, another source LUN 002 may be paired with target LUN 008 using snapshot method VDEV. Similarly, records 1003 and 1004 illustrate on May 10, 2012, using snapshot method CLONE, source LUN 001 and 002 may be paired with target LUN 005 and 006 respectively for backups. And records 1005 and 1006 illustrate on Jun. 11, 2012, using snapshot method BCV, source LUN 001 and 002 may be paired with target LUN 003 and 004 respectively for backups.

The snapshot details stored in the index database 160 may be extracted. And the list of snapshot details may be sorted in chronological order based on the timestamp column 1050. A chronological representation of the snapshot history based upon the snapshot details sorted in chronological order may then be displayed. An example chronological representation may be a display of snapshot pairings along a timeline 1060. Along the timeline 1060, time instances 1062-266 representing three different timestamps 1050 may be displayed. At each of the time instances 1062-1066, the value from the timestamp 1050 and a pictorial view of the snapshot pairings at the time instance may be displayed in the management console 159 GUI.

The pictorial view may include widgets, such as icons, graphs, or text representing the snapshot characteristics of host, source and target storage pairings, among other. The pictorial view may also include linkages connecting the widgets representing connections among storage components. For example, according to the example table 1000, on Apr. 12, 2012, pairings 1001 and 1002 are used for snapshot method VDEV. A pictorial view 1070 presenting the pairings 1001 and 1002 may be displayed below the time instance 1062. The pictorial view 1070 may have widgets representing snapshot characteristic such as the host identifier A, the source LUNs 001 and 002, the target LUNs 007 and 008. The pictorial view 1070 may also depict the connection between the source and the target storage. The connection may have text component indicating the snapshot method VDEV is configured for the pairing. The snapshot history map shown in FIG. 10 is for illustration purpose, the presentation of the map may vary depending on the user preference. For example, between the host and the source storage, one or more storage stack layers.

The chronological presentation 1070 of a snapshot history may give an intuitive view of storage system performance and system resource usage during snapshot backups. At each time instance along the timeline, the storage pairings used to perform snapshots are shown. The timeline view illustrates storage devices usage during various points in time of snapshot backups. Further, in some embodiments, the choice of a target device from a target storage pool for pairing is made based on data change rate. The depiction of the storage pairings along the timeline may also reflect the data change rate fluctuation in the storage system.

Figure 11:
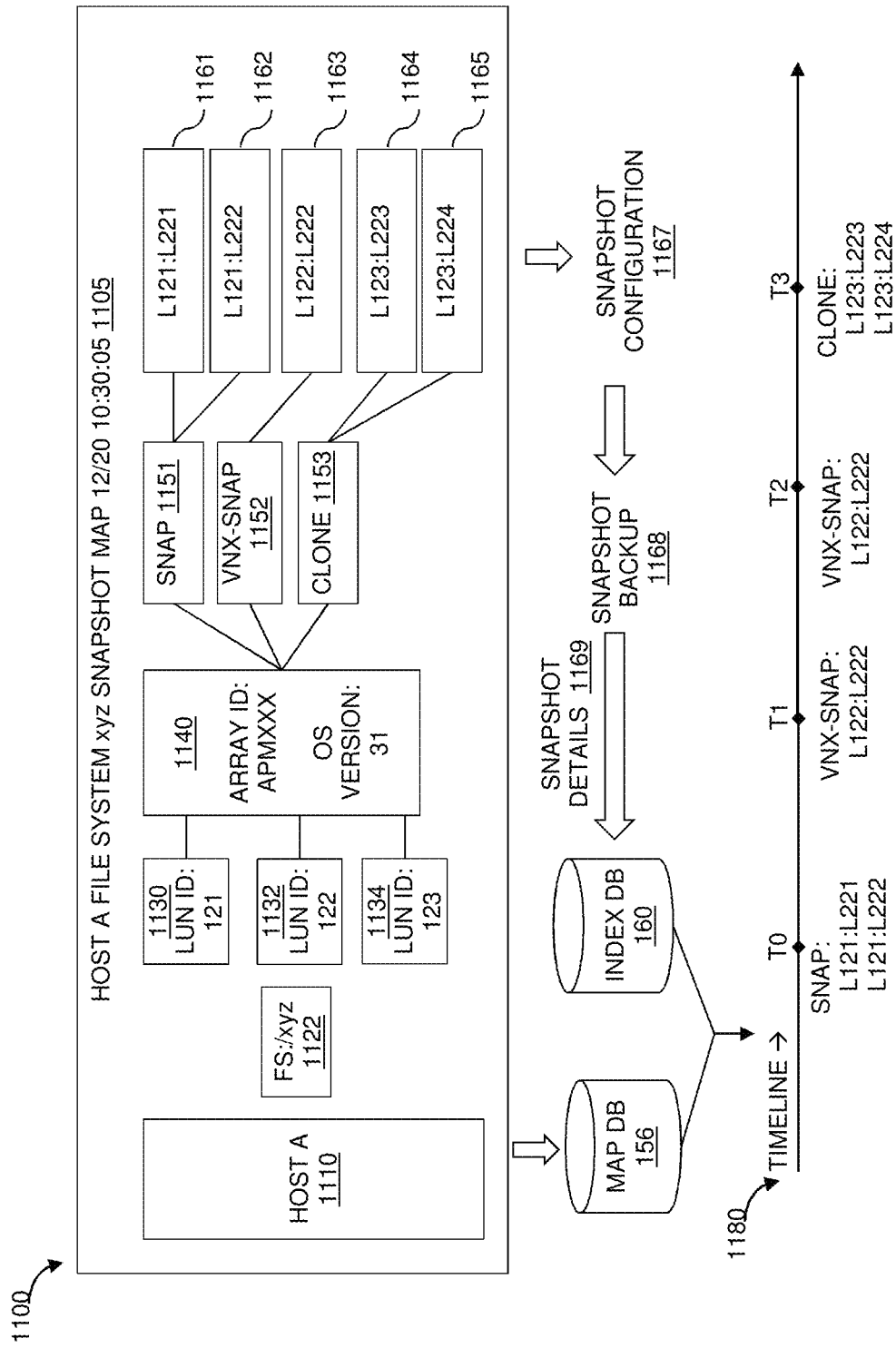
FIG. 11 is a diagram of an example system illustrating generating a snapshot history map.

FIG. 11 is a diagram of a system 1100, according to an example embodiment, illustrating generating a snapshot history map. In FIG. 11, an example snapshot map 1105 may be generated using the method illustrated in FIG. 4A, FIG. 4B, and FIG. 5. The title of the snapshot map 1105 may indicate the snapshot map 1105 is generated based on a set of selection criteria received by the selection engine 151. The set of selection criteria may include a host with an identifier of "a" and a file system xyz operatively coupled with the selected host. Based on the selection criteria, three source storages 1130-1134 with LUNs 121-123 respectively, an array 1140 with an identifier of APMXXX and running operating system version 31, three snapshot methods SNAP, VNX-SNAP and clone denoted as 1151-1153, and five target storage pairings denoted as 1161-1165 may be extracted by the analyzer 152. In some example embodiments, the snapshot map 1105 may be stored in the snapshot map database 156 for future retrieval.

Having generated the snapshot map 1105, snapshot configurations may be performed in an action 1167 according to methods illustrated in FIG. 9. Snapshot backups may then be performed using the snapshot configuration. The action of snapshot backups is denoted as 1168. After each successful snapshot, snapshot details 1169 may be stored in the index database 160. Using the data from the snapshot map database 156 and the index database 160, a snapshot history map 1180 may be generated and displayed along a timeline. At each time instance along the timeline, source and target storage pairings used in the snapshot at the time instance may be displayed along with the snapshot methods used. For example, at time instance T0, the pairing of source LUN 121 and target LUN 221 and the pairing of source LUN 121 and target LUN 222 configured for SNAP method are used in the snapshot. At time instance T1 and T2, the pairing of source LUN 122 and target LUN 222 configured for VNX-SNAP method is used in the snapshot. And at time instance T3, the pairing of source LUN 123 and target LUN 223 and the pairing of source LUN 123 and target LUN 224 configured for CLONE method are used in the snapshot.

Figure 12:
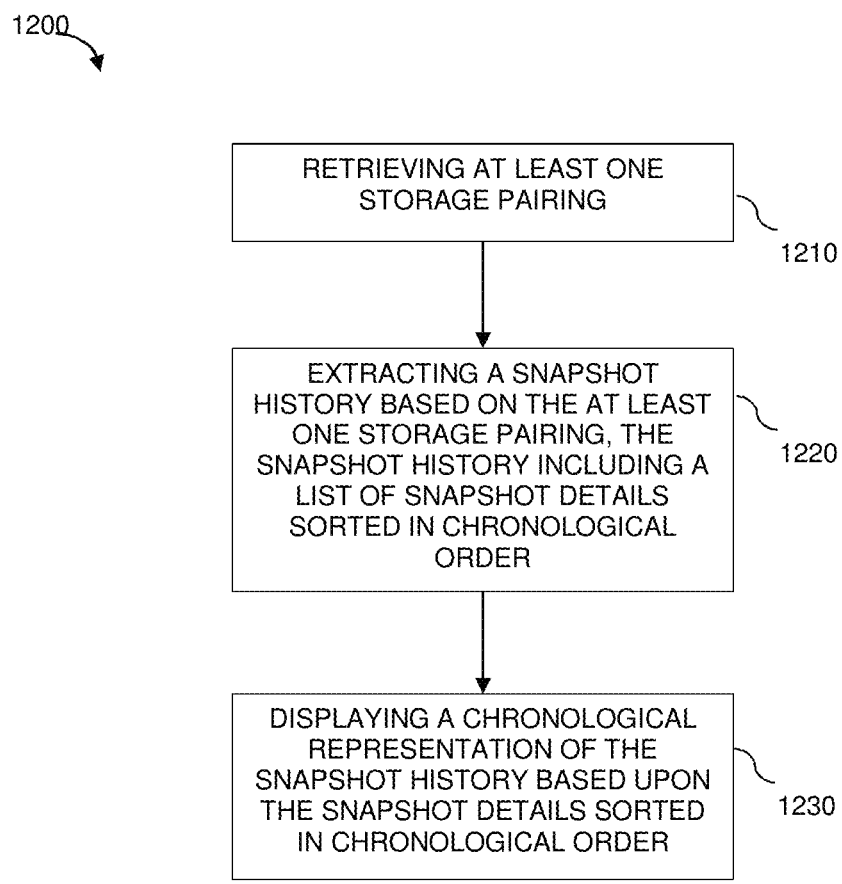
FIG. 12 is a diagram of an example computer implemented method executed to generate a snapshot history map.

FIG. 12 is a diagram of a computer implemented method 1200, according to an example embodiment, executed to generate a snapshot history map. Illustrated are operations 1210 through 1230 that are executed by, for example, the report engine 154 that resides on the backup server 150. An operation 1210 is executed by, for example, the retrieving module 392 that resides on the report engine 154, to retrieve at least one storage pairing. In some example embodiments, the at least one storage pairing may be retrieved from the snapshot map database 156. Each of the at least one storage pairing may include a source storage and a target storage configured to store snapshots of the source storage using a snapshot method. The source storage may be represented by a source LUN configured to store data generated by a host. The target storage may be represented by a target LUN. The snapshot method may be represented by a snapshot method name. And the host is represented by a host identifier.

After retrieving the at least one storage pairings, an operation 1220 is executed by, for example, an extracting module 394 that resides on the report engine 154, to extracting a snapshot history based on the at least one storage pairing. The snapshot history may include a list of snapshot details sorted in chronological order. In some embodiments, the list of snapshot details is sorted in chronological order according to the snapshot timestamp. The snapshot details may be generated after the backup server 150 performs successful snapshots using the at least one storage pairing. The snapshot details may include at least one of a host identifier, a file system name, a source Logical Unit Number (LUN), an array identifier, an operating system version number, a snapshot method name, a target LUN, and a snapshot timestamp. Example snapshot details are illustrated in FIG. 10. In some embodiments, the snapshot details may be stored in the index database 160. The additional retrieving module 398 may query the index database 160 to extract the snapshot history of the at least one storage pairing.

The extracted snapshot history may be displayed by executing an operation 1230. The operation 1230 is executed by, for example, the display module 396 that resides on the report engine 154, to display a chronological representation of the snapshot history based upon the snapshot details sorted in chronological order. The snapshot history may be mapped as a chronological representation of the snapshot history along a timeline. At each time instance of the timeline, an item from the list of snapshot details is displayed representing a snapshot taken at the time instance using a storage pairing from the at least one storage pairing. Examples of the snapshot history map display are shown in FIG. 10 and FIG. 11.

Figure 13:
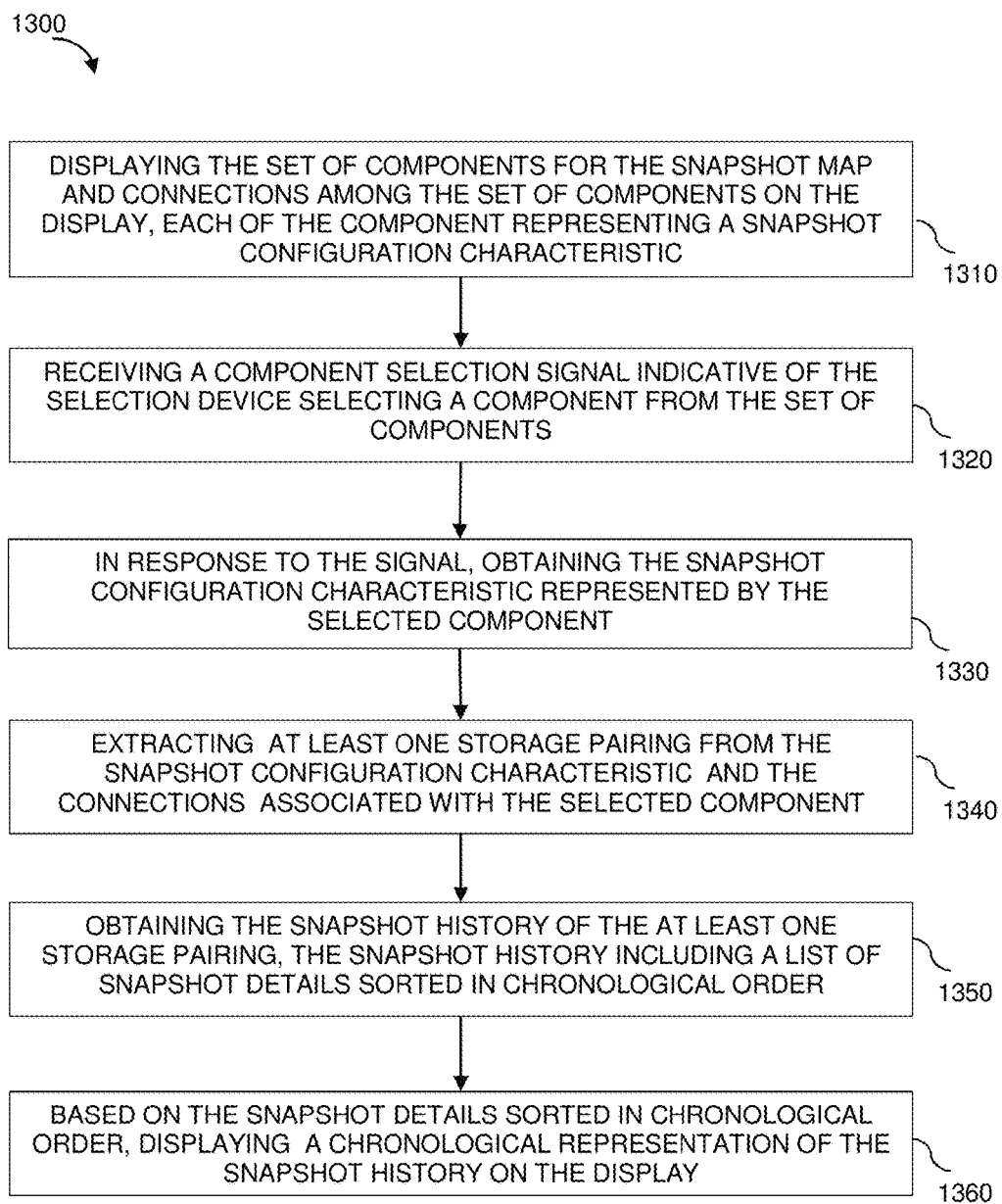
FIG. 13 is a diagram of an example method executed to display a snapshot history map.

FIG. 13 is a diagram of a method 1300, according to an example embodiment, executed to display a snapshot history map. Illustrated are operations 1310 through 1360 that are executed by, for example, the backup server 150. The backup server 150 may be a computer system having a display and a selection device. As illustrated in FIG. 1, the management console 159 may be operatively coupled to the backup server 150. The management console 159 may provide a GUI on its display. An operation 1310 is executed to display the set of components for the snapshot map on the GUI, with each of the component representing a snapshot configuration characteristic. An example display of the snapshot map is illustrated in FIG. 2. As shown in FIG. 2, the snapshot map may be displayed as widgets representing the set of components and linkages among the widgets representing connections among the set of components. The connections may include at least one of a relationship between a host and a source storage, a relationship between a source storage and a snapshot method, and a relationship between a snapshot method and a target storage.

After providing the snapshot map, an operation 1320 is executed to receive a component selection signal indicative of the selection device selecting a component from the set of components. The selection device may be an input device configured as at least one of a physical or a virtual key pad, a touch pad, a stylus, a mouse, a trackball, an image sensor, a capacitive touch screen, a resistive touch screen, or a voice recognition sensor, among others. In response to the component selection signal, an operation 1330 is executed to obtain the snapshot configuration characteristic represented by the selected component. For example, on a resistive touch screen, a user points at a widget representing a host, selects the widget. In response to the selection signal, the backup server 150 may obtain a host identifier associated with the host. Other snapshot configuration characteristics may include a file name associated with a file system, a source LUN associated with a source storage, an array identifier associated with an array, an operating system version number associated with an operating system, a snapshot method name associated with a snapshot method, and a target LUN associated with a target storage.

Following the selection, an operation 1340 is executed to extract at least one storage pairing based on the snapshot configuration characteristic of the selected component and the connections associated with the selected component. In some example embodiments, methods outlined in U.S. patent application Ser. Nos. 13/841,234, 13/841,717, 13/842,710, and 13/843,109 may be used to extract the at least one storage pairing. After extracting the at least one storage pairing, an operation 1350 is executed to obtain the snapshot history of the at least one storage pairing. The snapshot history may include a list of snapshot details sorted in chronological order. Based on the snapshot details sorted in chronological order, an operation 1360 is executed to display a chronological representation of the snapshot history on the GUI. Examples of the chronological representation are shown in FIG. 10 and FIG. 11. As shown in FIG. 10-11, the chronological representation may include a timeline and one or more storage pairings next displayed at each time instances along the timeline. The one or more storage pairings may represent a snapshot taken at the time instance using the storage pairings.

For the sake of clarity, the processes and methods herein have been illustrated with a specific flow, but it should be understood that other sequences may be possible and that some may be performed in parallel, without departing from the spirit of the system and method. Additionally, steps may be subdivided or combined.

All references cited herein are intended to be incorporated by reference. Although the present system and method has been described above in terms of specific embodiments, it is anticipated that alterations and modifications to this system and method will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the system and method is not to be limited to the details given herein. It is therefore intended that the disclosure and following claims be interpreted as covering all such alterations and modifications as fall within the true spirit and scope of the system and method.

What is claimed is:

1. A computer implemented method comprising:
receiving a set of selection criteria;
generating a snapshot map of a storage system based on the set of selection criteria, the snapshot map comprising a graphical representation of a configuration of the storage system to display on a screen of a management console graphical user interface (GUI) to a user, the graphical representation comprising:
a plurality GUI widgets representing a source logical unit number (LUN), a storage array, a snapshot method, and a target LUN that stores snapshots; and
a plurality of GUI linkages between the plurality of GUI widgets representing that the source LUN is hosted by the storage array, the snapshot method is provided by the storage array, the source LUN is paired with the target LUN, and the snapshots on the target LUN are created using the snapshot method;
associating the snapshot map with a timestamp;
storing the snapshot map along with the timestamp;
upon a change of the configuration of the storage system to a new configuration, generating a new snapshot map comprising a new graphical representation of the new configuration to display to the user;
associating the new snapshot map with a new timestamp;
storing the new snapshot map along with the new timestamp; and
trending the snapshot map and new snapshot map to identify storage system configuration changes over time.

2. The method of claim 1, wherein the set of selection criteria includes at least one of a host identifier associated with the host, a file name associated with a file system, a logical unit number (LUN) associated with the source storage, an array identifier associated with an array, an operating system version number associated with an operating system, and a snapshot method name associated with a snapshot method.

3. The method of claim 2, wherein the generating of the snapshot map based on the set of selection criteria comprises:
determining that at least one of the file system, the source storage, the array, the operating system, or the snapshot method is selected as the set of selection criteria;
obtaining at least one target storage based on the set of selection criteria;
associating the at least one target storage with the set of selection criteria; and
organizing the snapshot map based on the association.

4. The method of claim 2, wherein the generating of the snapshot map based on the set of selection criteria comprises:
determining that the host identifier is selected as the set of selection criteria;
based on the host identifier, selecting the file system, the source storage, the array, the operating system, or the snapshot method into the set of selection criteria;
obtaining at least one target storage based on the set of selection criteria;
associating the at least one target storage with the set of selection criteria; and
organizing the snapshot map based on the association.

5. The method of claim 1, further comprising:
associating an identifier after storing the snapshot map and the timestamp in a database; and
displaying the snapshot map after obtaining the snapshot map from the database based on the identifier.

6. The method of claim 1, wherein receiving the set of selection criteria is via a Graphical User Interface (GUI).

7. A system comprising a computer having memory storing:
a selection engine, executed by the computer, to receive a set of selection criteria;
a generator module, executed by the computer, that resides on an analyzer, to generate a snapshot map of a storage system based on the set of selection criteria, the snapshot map comprising a graphical representation of a configuration of the storage system to display on a screen of a management console graphical user interface (GUI) to a user, the graphical representation comprising:
a plurality of GUI widgets representing a source logical unit number (LUN), a storage array, a snapshot method, and a target LUN that stores snapshots; and
a plurality of GUI linkages between the plurality of GUI widgets representing that the source LUN is hosted by the storage array, the snapshot method is provided by the storage array, the source LUN is paired with the target LUN, and the snapshots on the target LUN are created using the snapshot method;
a timestamp module, executed by the computer, that resides on the analyzer, to associate the snapshot map with a timestamp;
a storing module, executed by the computer, that resides on the analyzer, to store the snapshot map along with the timestamp, wherein upon a change of the configuration of the storage system to a new configuration, the generator module generates a new snapshot map comprising a new graphical representation of the new configuration of the storage system for display to the user, the timestamp module associates the new snapshot map with a new timestamp, and the storing module stores the new snapshot map along with the new timestamp, and
wherein a trending is performed using the snapshot map and the new snapshot map to identify storage system configuration changes over time.

8. The system of claim 7, wherein the set of selection criteria includes at least one of a host identifier associated with the host, a file name associated with a file system, a logical unit number (LUN) associated with the source storage, an array identifier associated with an array, an operating system version number associated with an operating system, and a snapshot method name associated with a snapshot method.

9. The system of claim 8, wherein the generator module comprises:
a determination module, executed by the computer, to determine that at least one of the file system, the source storage, the array, the operating system, or the snapshot method is selected as the set of selection criteria;
an extraction module, executed by the computer, to obtain at least one target storage based on the set of selection criteria;
an association module, executed by the computer, to associate the at least one target storage with the set of selection criteria; and
an organization module, executed by the computer, to organize the snapshot map based on the association.

10. The system of claim 8, wherein the generator module comprises:
a determination module, executed by the computer, to determine that the host identifier is selected as the set of selection criteria;
based on the host identifier, the selection engine to select the file system, the source storage, the array, the operating system, or the snapshot method into the set of selection criteria;
an extraction module, executed by the computer, to obtain at least one target storage based on the set of selection criteria;
an association module, executed by the computer, to associate the at least one target storage with the set of selection criteria; and
an organization module, executed by the computer, to organize the snapshot map based on the association.

11. The system of claim 7, further comprising:
the storing module, that resides on the analyzer, to associate an identifier after storing the snapshot map and the timestamp in a database; and
a display module, executed by the computer, that resides on a report engine, to display the snapshot map after obtaining the snapshot map from the database based on the identifier.

12. The system of claim 7, wherein the selection engine receives the set of selection criteria via a Graphical User Interface (GUI).

13. In a computer system having a Graphical User Interface (GUI) including display and a selection device, a method of providing and selecting from a snapshot map on the display, the method comprising:
retrieving, by the computer system, a set of components for the snapshot map, each of the components representing a snapshot configuration characteristic;
displaying, within the snapshot map, the set of components on the display for a user at the display, the set of components comprising a storage array, a first snapshot method, a second snapshot method, different from the first snapshot method, a first target LUN, and a second target LUN;
displaying, to the user at the display, a first graphical line between the storage array and the first snapshot method to indicate that the storage array provides for the first snapshot method;
displaying, to the user at the display, a second graphical line between the storage array and the second snapshot method to indicate that the storage array provides for the second snapshot method;
displaying, to the user at the display, a third graphical line between the first snapshot method and the first target LUN to indicate that the first target LUN is configured for storing backup data of the storage array generated according to the first snapshot method;
displaying, to the user at the display, a fourth graphical line between the second snapshot method and the second target LUN to indicate that the second target LUN is configured for storing backup data of the storage array generated according to the second snapshot method;
receiving a component selection signal indicative of the selection device selecting a component from the set of components; and
in response to the signal, obtaining the snapshot configuration characteristic represented by the selected component.

14. The method of claim 13, wherein the set of components includes at least one of a host, a file system operatively coupled to the host, a source storage operatively connected to the host, an array hosting the source storage, an operating system running on the array, a snapshot method used to back up the source storage, and a target storage paired with the source storage using the snapshot method.

15. The method of claim 14, wherein the snapshot configuration characteristic includes at least one of a host identifier associated with the host, a file name associated with the file system, a source logical unit number (LUN) associated with the source storage, an array identifier associated with the array, an operating system version number associated with the operating system, a snapshot method name associated with the snapshot method, and a target LUN associated with the target storage.

16. The method of claim 13, wherein the selection device is an input device configured as at least one of a physical or a virtual key pad, a touch pad, a stylus, a mouse, a trackball, an image sensor, a capacitive touch screen, a resistive touch screen, or a voice recognition sensor.

17. The method of claim 13, wherein on the display, the snapshot map is depicted as widgets representing the set of components and linkages among the widgets representing connections among the set of components.

18. The method of claim 17, further comprising:
deriving snapshot configuration characteristics representing pairings between source storages and target storages using snapshot methods from the selected component and the connections.

19. The method of claim 17, wherein the set of widget includes at least one of an icon, a graph or a text.

20. The method of claim 17, wherein the connections includes at least one of a relationship between a host and a source storage, a relationship between a source storage and a snapshot method, and a relationship between a snapshot method and a target storage.

* * * * *